United States Patent
Saitoh et al.

(10) Patent No.: US 9,865,859 B2
(45) Date of Patent: Jan. 9, 2018

(54) STACKED-TYPE SECONDARY BATTERY

(71) Applicants: KABUSHIKI KAISHA NIHON MICRONICS, Musashino-shi, Tokyo (JP); GUALA TECHNOLOGY CO., LTD, Kobe-shi, Hyogo (JP)

(72) Inventors: Tomokazu Saitoh, Musashino (JP); Shozo Izumo, Musashino (JP); Tatsuo Inoue, Musashino (JP); Akira Nakazawa, Kobe (JP)

(73) Assignees: KABUSHIKI KAISHA NIHON MICRONICS, Tokyo (JP); GUALA TECHNOLOGY CO., LTD., Kobe-shi (JP)

( * ) Notice: Subject to any disclaimer, the term of this patent is extended or adjusted under 35 U.S.C. 154(b) by 309 days.

(21) Appl. No.: 14/781,444

(22) PCT Filed: Apr. 3, 2014

(86) PCT No.: PCT/JP2014/059787
§ 371 (c)(1),
(2) Date: Sep. 30, 2015

(87) PCT Pub. No.: WO2015/145783
PCT Pub. Date: Oct. 1, 2015

(65) Prior Publication Data
US 2016/0043375 A1 Feb. 11, 2016

(30) Foreign Application Priority Data
Mar. 26, 2014 (JP) .................................. 2014-064868

(51) Int. Cl.
*H01M 2/20* (2006.01)
*H01M 10/0585* (2010.01)
(Continued)

(52) U.S. Cl.
CPC ............ *H01M 2/202* (2013.01); *H01M 2/204* (2013.01); *H01M 10/052* (2013.01); *H01M 10/0562* (2013.01); *H01M 10/0585* (2013.01)

(58) Field of Classification Search
CPC .... H01M 2/202; H01M 2/204; H01M 10/052; H01M 10/0562
(Continued)

(56) References Cited

U.S. PATENT DOCUMENTS

2010/0279161 A1  11/2010  Kang et al.
2011/0256436 A1*  10/2011  Eo .......................... H01M 2/024
                                                          429/94
(Continued)

FOREIGN PATENT DOCUMENTS

JP   2003-168416 A   6/2003
JP   2004-158222 A   6/2004
(Continued)

OTHER PUBLICATIONS

Jun. 10, 2014 Search Report issued in International Patent Application No. PCT/JP2014/059787.

Primary Examiner — Basia A Ridley
Assistant Examiner — James M Erwin
(74) Attorney, Agent, or Firm — Oliff PLC

(57) ABSTRACT

A structure with suppressed thickness and high-density when battery cells of a thin-film-solid secondary battery are stacked. Adjacent battery cells are stacked such that negative electrodes are in contact with each other and positive electrodes are in contact with each other, and arranged such that a taking-out lead electrode smaller than negative or positive electrode surfaces are sandwiched between two negative electrodes in contact with each other or two positive electrodes in contact with each other, and the lead electrodes sandwiched between electrodes of different layers
(Continued)

are arranged such that there is no region where all of the lead electrodes simultaneously overlap one another as viewed in a planar arrangement. There are a strip-shaped lead electrode and a linear lead electrode. Further, a conductive sheet forming the electrode is extended to also serve as the taking-out electrode, thereby making it possible to reduce the number of lead electrodes.

19 Claims, 24 Drawing Sheets

(51) Int. Cl.
*H01M 10/052* (2010.01)
*H01M 10/0562* (2010.01)
(58) Field of Classification Search
USPC .......................................................... 429/152
See application file for complete search history.

(56) References Cited

U.S. PATENT DOCUMENTS

| | | |
|---|---|---|
| 2011/0281160 A1 | 11/2011 | Doi |
| 2013/0149580 A1 | 6/2013 | Kim |

FOREIGN PATENT DOCUMENTS

| | | | |
|---|---|---|---|
| JP | 2008-198492 A | | 8/2008 |
| JP | 2009-043481 A | | 2/2009 |
| JP | 2009-140707 A | | 6/2009 |
| JP | 2010-532545 A | | 10/2010 |
| JP | 2011-082097 A | | 4/2011 |
| JP | 2012-033277 A | | 2/2012 |
| JP | 2013-182735 A | | 9/2013 |
| JP | 2013-535802 A | | 9/2013 |
| WO | 2010/089855 A1 | | 8/2010 |

* cited by examiner

Fig. 11
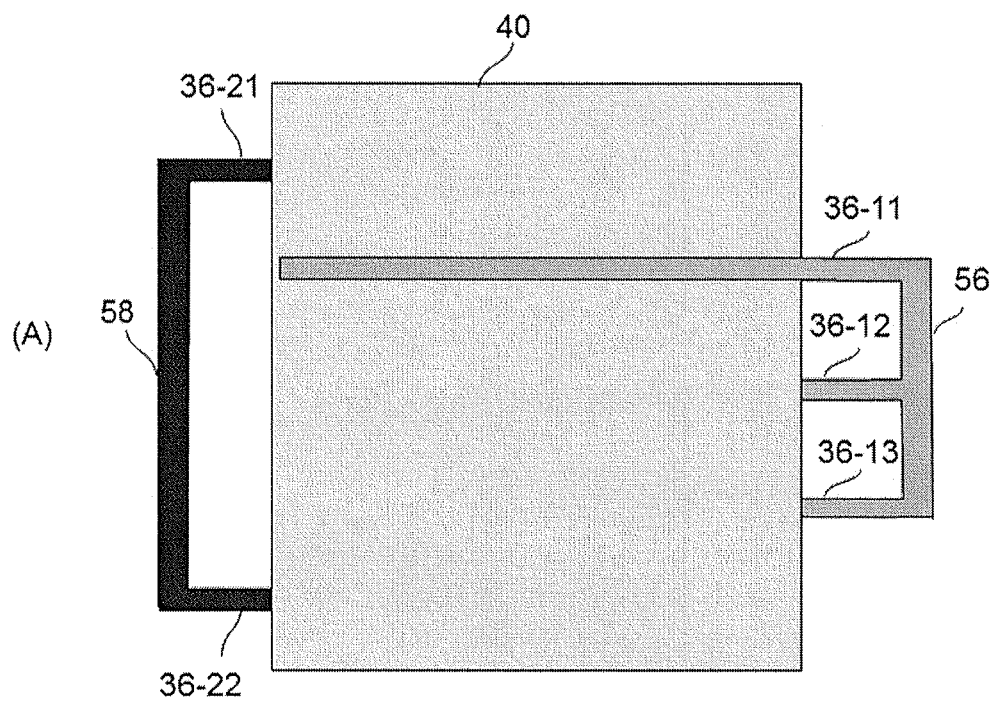
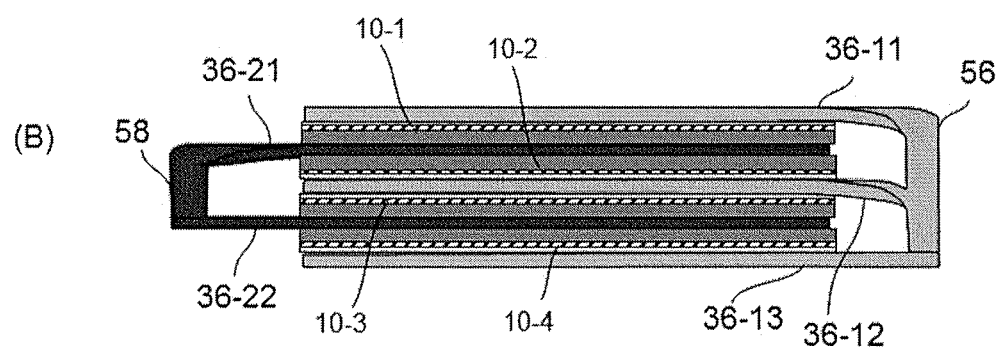

Fig. 14
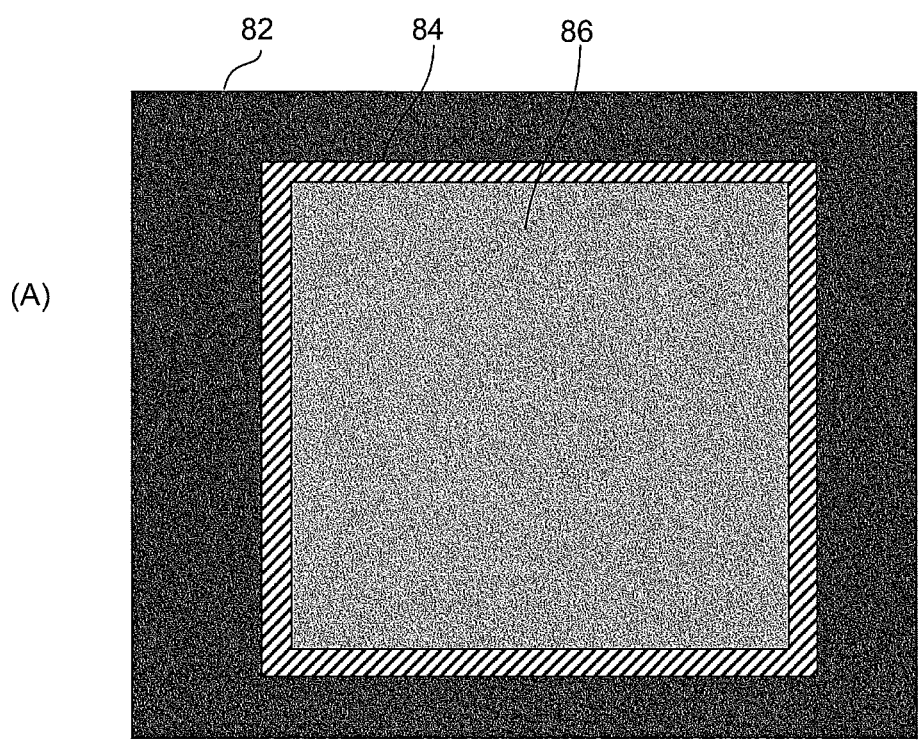
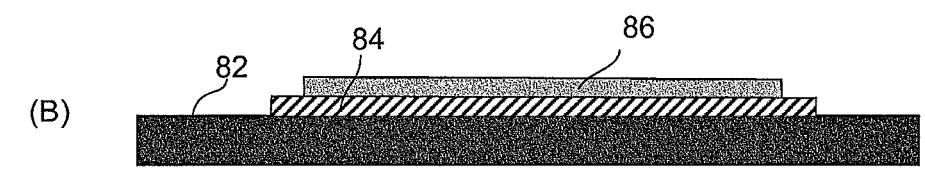

Fig. 16
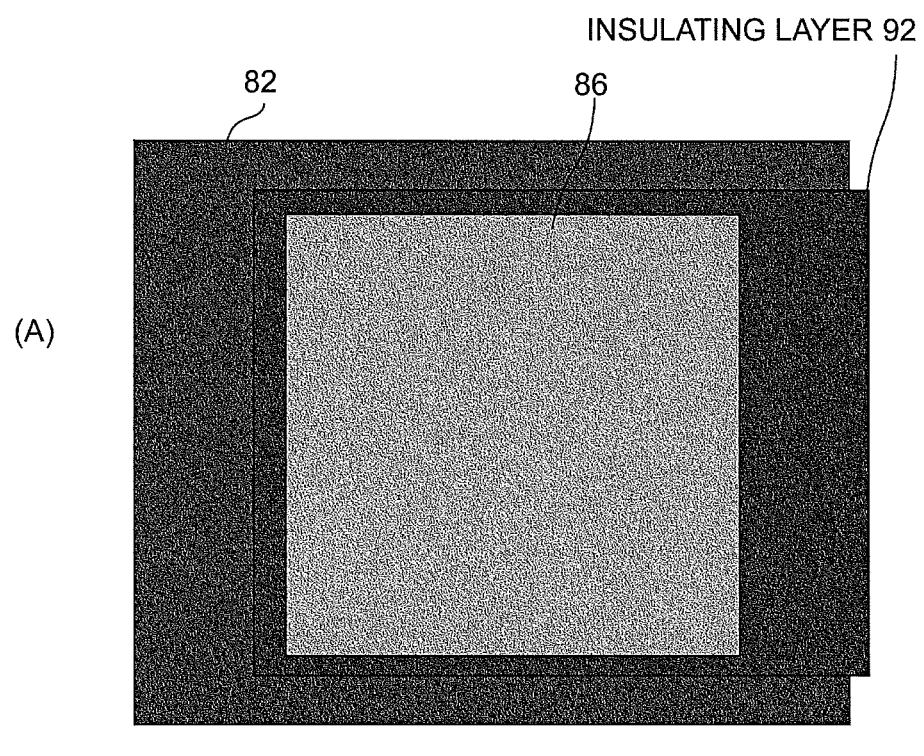
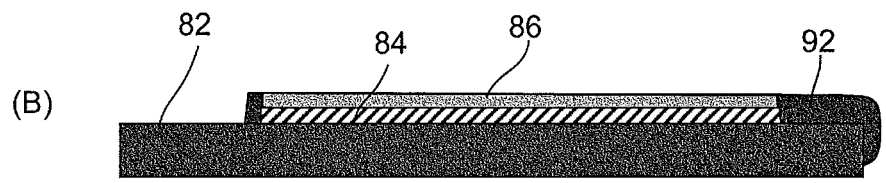

Fig. 18
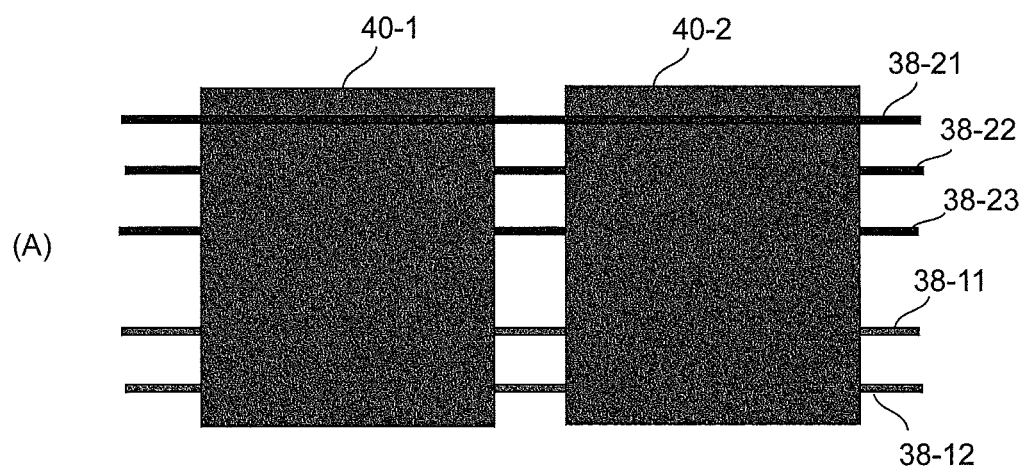
(A)
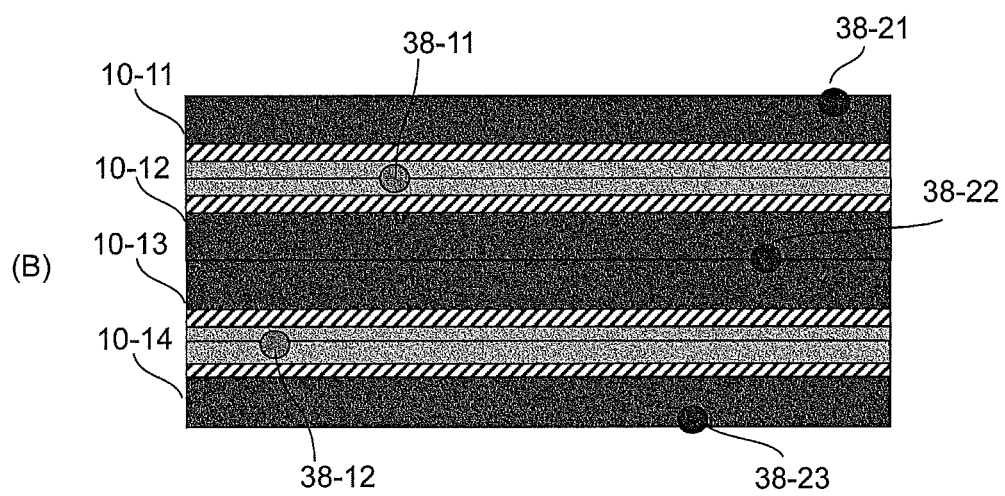
(B)

Fig. 19
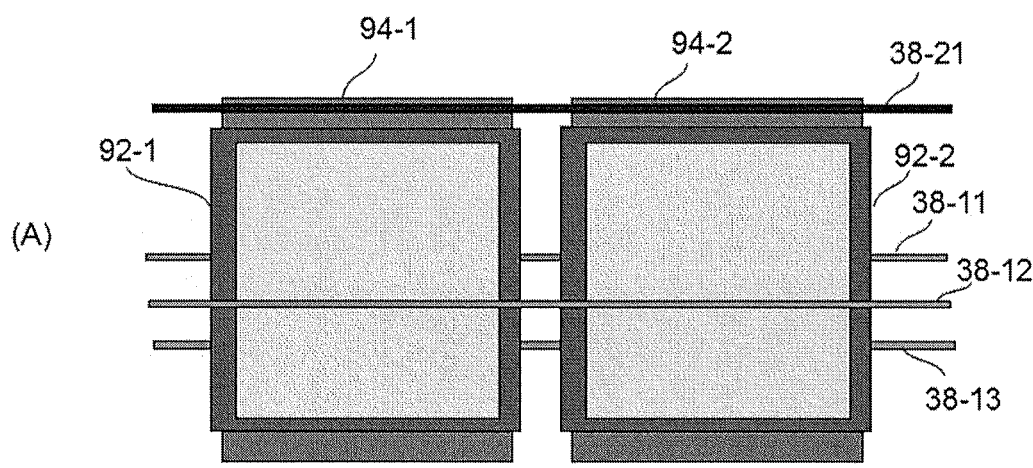
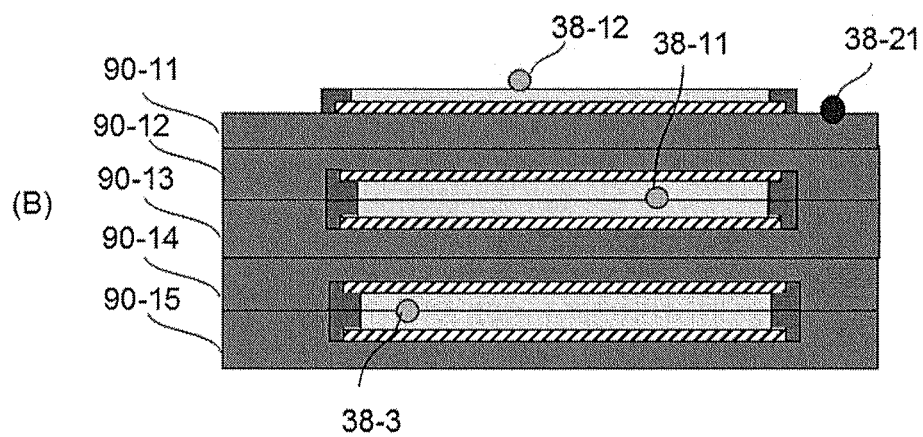

Fig. 21
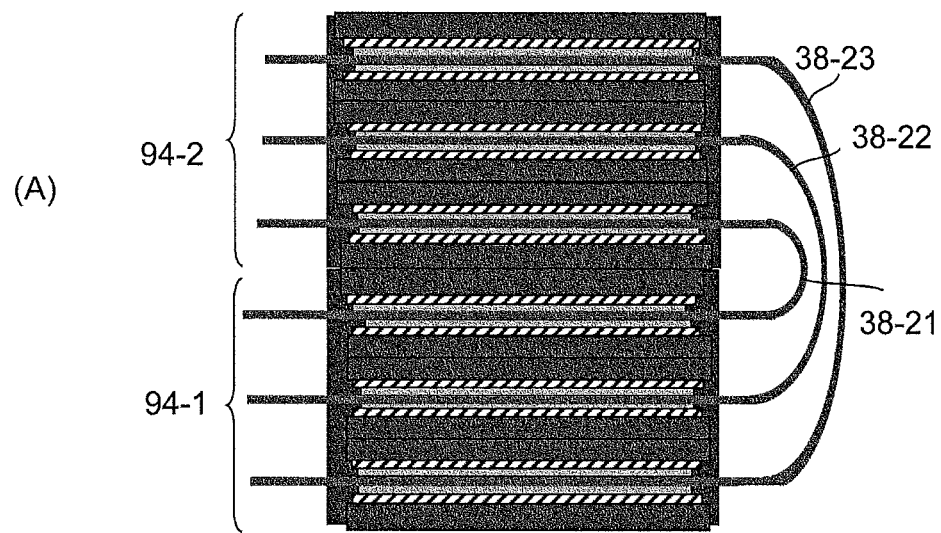
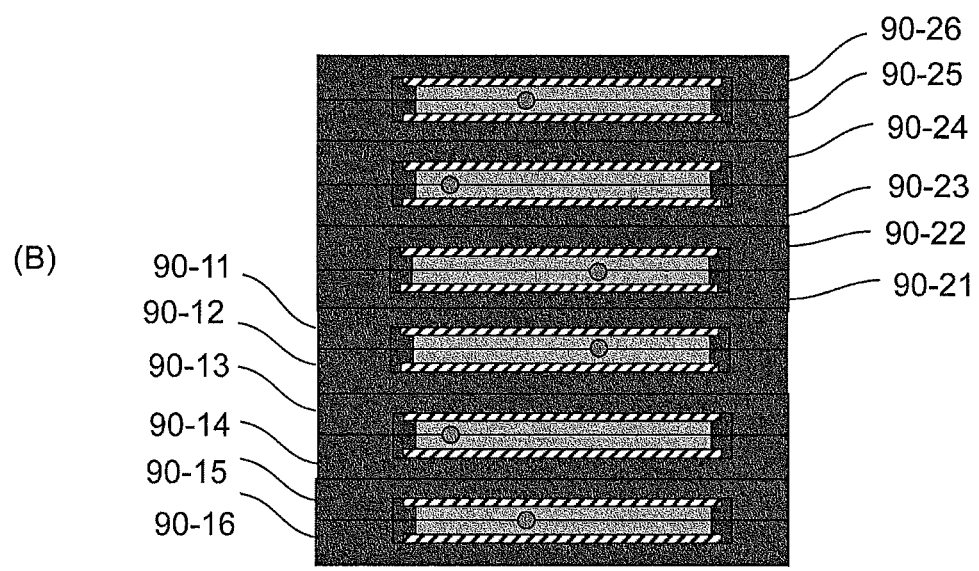

STACKED-TYPE SECONDARY BATTERY

TECHNICAL FIELD

The present invention relates to a lead electrode that is provided between a plurality of solid batteries to electrically connect the solid batteries in parallel in the case of increasing the capacity by stacking the solid batteries.

BACKGROUND ART

As a secondary battery that can charge and hold electricity therein, a lead-acid storage battery, a nickel-cadmium storage battery, a lithium-ion secondary battery and so on have been developed and practically used, and a high-performance lithium-ion secondary battery attracts attention recently. The lithium-ion secondary battery uses an organic solvent and is used in a variety of usages by optimizing a cathode active material, an anode active material, an organic solvent electrolyte solution and so on.

The secondary battery is configured such that battery cells of the secondary battery are stacked in multi layers and electrically connected in parallel to increase the electric capacity to be stored.

In the lithium-ion secondary battery disclosed in Patent Document 1, a structure is employed in which a sheet-shaped separator 7 is folded like an accordion and positive electrodes and negative electrodes are alternately inserted therein as illustrated in FIG. 22. At cathode plates 8 and anode plates 9, lead parts 8a, 9a projecting to sides opposite each other from a continuous body of the separator are provided, and the lead parts 8a, 9a of the cathode and anode are separately gathered together and electrically connected with one another.

The continuous body of the separator 7 is composed of a porous film formed with fine pores made of a synthetic resin such as a polyolefin-based resin. The cathode plate 8 is formed by applying a cathode active material such as lithium transition metal composite oxide on both surfaces of sheet-shaped metal foil. The anode plate 9 is formed by applying an anode active material such as carbon material on both surfaces of sheet-shaped metal foil. A plurality of the cathode plates and a plurality of the anode plates are separately gathered together so that the unit cells are connected in parallel.

Since the lithium-ion secondary battery uses a flammable organic solvent electrolyte solution, the organic solvent electrolyte solution decomposes by the electrode reaction and thereby expands the outer can of the battery to possibly cause leakage of the electrolyte solution in some cases, and therefore a polymer lithium-ion secondary battery has been developed for the purpose of reducing the size and weight and improving the safety. This is made by using a gelatinous electrolyte in place of the electrolyte solution used in the conventional lithium-ion secondary batteries. The gelatinous electrolyte contains the electrolyte solution and further contains a matrix polymer such as polyethylene oxide, polyvinylidene fluoride-propylene hexafluoride copolymer, polyacrylamide, polyacrylonitrile.

The lithium-ion secondary battery using the gelatinous electrolyte is disclosed, for example, in Patent-Document 2 in which a lithium-ion secondary battery 1 configured such that a unit cell is composed of a cathode plate 3 with a terminal tab 2 projecting from the end portion, a gelatinous electrolyte 4 formed in a film form, a separator S, and an anode plate 6 with a terminal tab 5 projecting from the end portion, and a plurality of unit cells are alternately stacked and subjected to heating press to form a multilayer membrane electrode assembly, is packed and sealed by a laminate film or the like such that a plurality of cathode plates and a plurality of anode plates are separately gathered together and the unit cells are connected in parallel as illustrated in FIG. 23.

Further, the structure disclosed in Patent-Document 3 as a stacked structure of an all-solid lithium-ion secondary battery has cathode layers having a cathode active material to/from which lithium ions move in/out, anode layers having an anode active material to/from which lithium ions move in/out, and solid electrolyte layers arranged between the cathode layers and the anode layers, in which two adjacent solid electrolyte layers are connected by an insulating layer, and two adjacent stacks are stacked such that the anode layers constituting the respective stacks 4 or the cathode layers constituting the respective stacks 4 are in contact with each other.

On a pair of side surfaces of the stacked stacks, a first current collector and a second current collector are arranged respectively. The first current collector is in contact with the cathode layer but not in contact with the anode layer so that the first current collector and the anode layer are separated by the insulating layer. Further, the second current collector is in contact with the anode layer but not in contact with the cathode layer so that the second current collector and the cathode layer are separated by the insulating layer. Terminal portions are arranged on the right and left ends and collector foil is arranged on the lower end, and a fastening load is applied thereto via the terminal portions. The stacked stacks are electrically connected with each other in parallel using the first current collector as the cathode and the second current collector as the anode.

As the stacked structure of the all-solid lithium-ion secondary battery, structures utilizing the fact that the solid electrolyte layer becomes the insulating film for paired electron conduction between adjacent cells are disclosed in Patent-Document 4 and Patent-Document 5.

In Patent-Document 4, the stack is an integrally sintered body, and a plurality of blocks in each of which battery cells of the secondary battery are stacked in series are joined together in parallel. In each of the serial blocks, a plurality of battery cell units, each having a cathode current collector layer, a cathode active material layer, an ion conductive inorganic material layer (solid electrolyte material layer), an anode active material layer and an anode current collector layer in this order, are joined together in series. The cathode current collector layers and the anode current collector layers other than those arranged at outermost layers are not extended out to end surfaces of the serial block, and the cathode current collector layer and the anode current collector layer located at the outermost layers extend out at least to different portions of the end surfaces of the serial block respectively, and all of the cathode current collector layers and all of the anode current collector layers located at outermost layers of the plurality of the serial blocks extend out at least to different portions of the end surfaces of the stack respectively.

A multilayer stacked battery in Patent-Document 5 is in a multilayer stacked structure composed of a plurality of battery cells at a plurality of stages, each of the battery cells being a thin film solid lithium-ion secondary battery composed of an anode active material layer and a cathode active material layer capable of absorbing and releasing lithium ions, a solid electrolyte layer arranged between them and having a function of electron-conductively separating and isolating them, and cathode side and anode side current collector layers composed of metal films having a function of collecting current directly above and directly below the active material layers. The multilayer stacked battery further utilizes the function of the solid electrolyte layer becoming an insulating film for paired electron conduction between adjacent cells, and utilizes the function of the current collector layer (metal film) becoming an insulating film for paired ion conduction between the active material layers of upper and lower adjacent cells, to coat and insulate the surroundings of the cathode and anode active material layers at the peripheral outside positions, by the solid electrolyte layer and the current collector layers. Further, the outer rim portions of the current collector layers are covered and insulated by the solid electrolyte layer at the outer rim portion outside positions. In the stacked structure, the structure in the plurality of stages is formed on one substrate by stacking the respective layers in order without using a new insulating film between the individual battery cells.

Further, Patent-Document 6 discloses an all solid-type battery structure in which it is easy to take out the electrode terminal of the all solid-type battery, and realize the electrical parallel connection of a plurality of batteries only by piling up battery cells of the secondary battery. The structure is made such that, as illustrated in FIG. 24, insulating substrates 106 each having a metal pattern 102 (taking-out electrode) and a contact hole 104 are arranged at the top and the bottom, and a power generating element 108, in which a cathode current collector, a cathode, a solid electrolyte, an anode, and an anode current collector are stacked, is arranged to be sandwiched between the insulating substrates 106. For example, one of the cathode and anode current collectors of the power generating element 108 is electrically connected to any of the metal patterns 102 of the insulating substrates 106 covering it via the contact hole 104, and the other current collector is electrically connected to any of the metal patterns 102 of the insulating substrates 106 covering it via the contact hole 104. The upper and lower insulating substrates 106 are bonded together to seal the power generating element, conduction is established by the metal patterns 102 via through holes 110 penetrating the insulating substrates 106 holding the power generating elements 108 sandwiched between them, from the metal pattern 102 connected via the contact hole 104 on the front surface of the sealed body to the metal pattern 102 not connected via the contact hole 104 on the rear surface.

The all solid-type battery structure, in which a cathode terminal and an anode terminal realized by taking-out electrodes exist on the upper surface of the unit cell, and a cathode terminal and an anode terminal also similarly exist on the lower surface, thereby enabling electrical parallel connection only by piling the unit cells.

Further, Patent-Document 7 discloses an electrode assembly capable of providing a battery in which modification of the shape and adjustment of the capacity are easy. In an ordered array of segments of the electrode assembly, segments extend while arranged side by side in one direction within one virtual plane. The number of virtual planes of the segments extending while arranged side by side is two or more, and the directions in which the segments extend within the virtual planes are different. The segments within one virtual plane may cross, having a difference of 90°, the segments within another plane. The interval between the segments is 0, or have an arbitrary size capable of providing molding workability of the battery, for example, 5 μm to several thousands μm. In some embodiments, between planes each composed of segments extending while arranged side by side, a separation film is further arranged.

PRIOR ART DOCUMENT

Patent Document

Patent Document 1: Japanese Laid-open Patent Publication No. 2009-140707
Patent Document 2: Japanese Laid-open Patent Publication No. 2013-182735
Patent Document 3: WO 2010/089855
Patent Document 4: Japanese Laid-open Patent Publication No. 2008-198492
Patent Document 5: Japanese Laid-open Patent Publication No. 2004-158222
Patent Document 6: Japanese Laid-open Patent Publication No. 2003-168416
Patent Document 7: Japanese Laid-open Patent Publication No. 2013-535802

DISCLOSURE OF THE INVENTION

Problems to be Solved by the Invention

As described above, various suggestions have been made relating to the stacked structure of the secondary battery, but the stacked structure of the lithium-ion battery utilizing the components of the secondary battery is realized by incorporating the positive electrodes and the negative electrodes as discrete elements and extending the solid electrolyte layer to use it as an insulator, and is therefore not applicable to the secondary batteries having other structures.

The structure in which the terminal tabs are provided at the positive electrode and the negative electrode as disclosed in Patent-Document 2 is made not in consideration of the thickness of the stack, and the cathode active material on the cathode current collector in the case of the cathode plate and the anode active material on the anode current collector in the case of the anode plate is made to avoid in a width of the connection part of the terminal tab, so that the charge function does not acts any longer in this region, resulting in a decrease of the capacity as the secondary battery. Further, it is necessary to provide terminal tabs at all of the cathodes and the anodes on the one by one basis.

The structure in which the battery cells are stacked and electrodes are taken out to the outside from the side surfaces of the electrode layers of the battery cells, is physically possible in the case where the electrodes are thick, but cannot be realized in the case of fabricating conductive electrodes, for example, by the vapor deposition or the sputtering, because of a small thickness of 1 μm or less.

Further, the structure in which the insulating substrates each having the metal pattern being the taking-out electrode and the contact hole are arranged on the top and the bottom of the battery cell and the battery cells are stacked, the stacked secondary battery becomes thick because the insulating substrates are interposed, and thus failing to fulfill the requirement for high-density packaging.

The electrode structure using segments in which modification of the shape is easy is the structure in which a plurality of segments are arranged in parallel as an ordered array of segments and cross the other plane, but is not intended for a stacked structure though it is easy to take out electrodes and thus needs to be further devised in terms of structure in order to make a stacked structure.

With the spread of portable electronic devices and technical improvement, electronic components which are increasingly integrated are highly densely packaged and their secondary battery being an energy source is increased in capacity, while a high-density stacking technique is demanded.

The present invention has an object to provide, as a packaging technique to respond to the demand, a structure in which battery cells of a thin film solid secondary battery are mainly densely stacked with suppressed thickness.

Means to Solve the Problems

The present invention is a structure using a taking-out lead electrode to electrically connect battery cells in parallel in a stacked-type secondary battery in which battery cells of one secondary battery are structurally stacked in series.

A stacked-type secondary battery of the present invention is a stacked-type secondary battery made by stacking a plurality of battery cells each in a planar shape having a charge layer that stores electricity sandwiched between a negative electrode and a positive electrode, wherein adjacent battery cells are stacked such that negative electrodes thereof are in contact with each other and positive electrodes thereof are in contact with each other, wherein a taking-out lead electrode that is smaller than a negative electrode surface or a positive electrode surface is sandwiched at least either between two negative electrodes in contact with each other or between two positive electrodes in contact with each other, and wherein lead electrodes sandwiched between electrodes of different layers are arranged such that there is no region where all of the lead electrodes simultaneously overlap one another as viewed from a surface where the lead electrode is taken out.

The lead electrode structure eliminates the situation that the thickness corresponding to the number of the lead electrodes to be sandwiched between the stacked battery cells is simply added, so that the thickness of the stacked battery cells in a region with no lead electrodes is not increased due to the lead electrodes.

The lead electrode sandwiched between the electrodes includes one lead electrode or a plurality of lead electrodes, and the lead electrode shape is a linear shape or a strip shape, or the strip-shaped lead electrode sandwiched between the electrodes may be a shape gradually increasing in width outward from a stacked part.

The lead electrode desirably has a resistivity equal to or lower than resistivities of the positive electrode and the negative electrode in contact therewith, and the lead electrode is in a shape extended from a taking-out part to the outside of the battery cell to an end portion inside the electrode to concentrate current from the cathode and anode in contact therewith on the lead electrode, thereby reducing the loss due to the resistance.

The strip-shaped lead electrode is integrally configured such that a plurality of lead electrodes are provided in a comb shape from a common electrode part. Different comb-shaped electrodes are used for the cathode and the anode, and the lead electrode is sandwiched between two negative electrodes in contact with each other when the lead electrode is used as a taking-out electrode for anode, and is sandwiched between two positive electrodes in contact with each other when the lead electrode is used as a taking-out electrode for cathode, and the lead electrodes for cathode and for anode are arranged not to simultaneously overlap one another.

The number of the lead electrodes sandwiched between the electrodes may be plural, and the number of the lead electrodes provided in the comb shape can be made larger than the number of spaces between the electrodes to be required, and a plurality of the lead electrodes can be arranged between the same electrodes.

To prevent short-circuit between the lead electrode and other portion, the lead electrode may be provided with an insulating layer for preventing short circuit near an end portion of the battery cell. Further, in the case where the lead electrode is not provided with the insulating layer, it is possible to make a structure in which the charge layer of the battery cell that is a unit to be stacked as the stacked-type secondary battery, a part of the electrode in contact with the lead electrode that is in contact with the lead electrode of another electrode, and a side surface part are covered by an insulating layer.

Taking-out by the lead electrode is performed only for one of the cathode and the anode, and the other of the negative electrode and the positive electrode is extended from a charge layer region to overlap as the taking-out electrode, thereby forming an electrode structure in which only one of the positive electrode and the negative electrode is taken out.

Further, the battery cell that is a unit to be stacked as the stacked-type secondary battery is formed such that a charge layer is formed in a region smaller than the positive electrode or the negative electrode on the positive electrode or the negative electrode, and a positive electrode or a negative electrode corresponding to the positive electrode or the negative electrode is formed in a region smaller than the charge layer, the battery cells are superposed one on the other such that the positive electrodes or the negative electrodes are in contact with each other, and the positive electrode or the negative electrode surrounded by the charge layer is taken out to the outside by the lead electrode, thereby increasing the margin of the positional accuracy when stacking the battery cells. Further, the charge layer exists also at the side surface of the electrode surrounded by the charge layer in the inside, resulting in a lean stacked structure.

The lead electrode in this structure is arranged to be taken out to the outside from the positive electrode or the negative electrode surrounded by the charge layer, and a portion in contact with the charge layer and one of the electrode is coated with an insulating layer. Further, the lead electrode may be arranged to be taken out to the outside from the positive electrode or the negative electrode surrounded by the charge layer, and an insulating layer may be provided at least in a region of the charge layer and the one of electrode parts in contact with the lead electrode.

The structure is configured such that the lead electrodes from electrode contact parts of a plurality of the stacked-type secondary batteries can be made common thereto, resulting in a structure in which stacked-type secondary batteries are further connected in parallel.

Further, the structure may be configured such that one of the positive electrode and the negative electrode is extended from the charge layer region to form a taking-out electrode, a lead electrode that electrically couples the plurality of stacked-type secondary batteries is arranged, and the lead electrodes from electrode contact parts of the plurality of stacked-type secondary batteries are made common as the other electrode. In this case, a lead electrode is necessary which electrically connects the electrodes made by extending them from the charge layer regions to form taking-out electrodes.

It is also possible to form a structure in which a plurality of stacked-type secondary batteries are further superposed, in which the electrodes on both side surface of the stacked-type secondary battery are the same positive electrodes or the negative electrodes; one of the positive electrode and the negative electrode is extended from a charge layer region to form a taking-out electrode, and the electrode extended to form the taking-out electrode is not connected by the lead electrode between the plurality of stacked-type secondary batteries, the lead electrodes from the electrode contact parts of the plurality of stacked-type secondary batteries are made common as the other electrode, and after the plurality of stacked-type secondary batteries are assembled using the lead electrode in common, the plurality of stacked-type secondary batteries are superposed one on the other by folding the stacked-type secondary batteries like an accordion with the common lead electrode located outside the stacked-type secondary batteries as a fold. In this case, a lead electrode is unnecessary which electrically connects the electrodes made by extending them from the charge layer regions to form taking-out electrodes.

Effects of the Invention

According to the present invention, battery cells being units of a secondary battery are stacked into a multilayer structure, and taking-out lead electrodes are inserted between electrodes in order to electrically connect the battery cells in parallel. By forming the lead electrode not into a sheet-shaped electrode but into a strip or linear electrode, arranging a taking-out electrode in a region smaller than the electrode of the battery cell, and preventing the situation that all of lead electrodes simultaneously overlap one another, it becomes possible to minimize the increase in thickness due to the lead electrodes in the case where the battery cells are stacked.

Further, by extending one of electrodes of the battery cell for a taking-out electrode and overlapping taking-out electrodes at the time of stacking the battery cells, it becomes possible to decrease the number of lead electrodes, resulting not only in facilitating the manufacturing work but also reducing the cost.

In the structure in which the lead electrodes of a plurality of stacked type-secondary batteries are made common, connection of the stacked-type secondary batteries in parallel and superposition of the stacked-type secondary batteries can be easily performed. In addition, by cutting the lead electrodes located outside, the structure can be made into individual stacked-type secondary batteries, thereby providing the effect capable of easily performing mass production of the stacked-type secondary batteries.

BRIEF DESCRIPTION OF DRAWINGS

FIG. 11 illustrates a stacked-type secondary battery using the comb-shaped electrode sheet;

FIG. 14 illustrates a battery cell in which the charge layer and the positive electrode are made smaller than the negative electrode;

FIG. 16 illustrates a battery cell in which a part of taking-out an internal electrode is coated with an insulating layer;

FIG. 18 illustrates stacked-type secondary batteries having lead electrodes common thereto;

FIG. 19 illustrates a plurality of stacked-type secondary batteries having lead electrodes common to battery cells provided with insulating layers;

FIG. 21 illustrates a structure of stacked-type secondary batteries in which a plurality of stacked-type secondary batteries having lead electrodes common thereto are folded and superposed one on the other;

BEST MODE FOR CARRYING OUT THE INVENTION

The all-solid secondary battery is characterized in that it is safe and high in energy density and can be fabricated to be thin even when the secondary batteries fabricated using thin films are stacked, but needs to hold a taking-out lead electrode sandwiched between connection parts of electrodes in order to electrically connect the stacked battery cells in parallel.

The present invention is intended for a stacked-type secondary battery with a thickness suppressed to the minimum even when the lead electrode is sandwiched, and mainly for a secondary battery using a thinned electrode for a positive electrode and/or a negative electrode.

Figure 1:
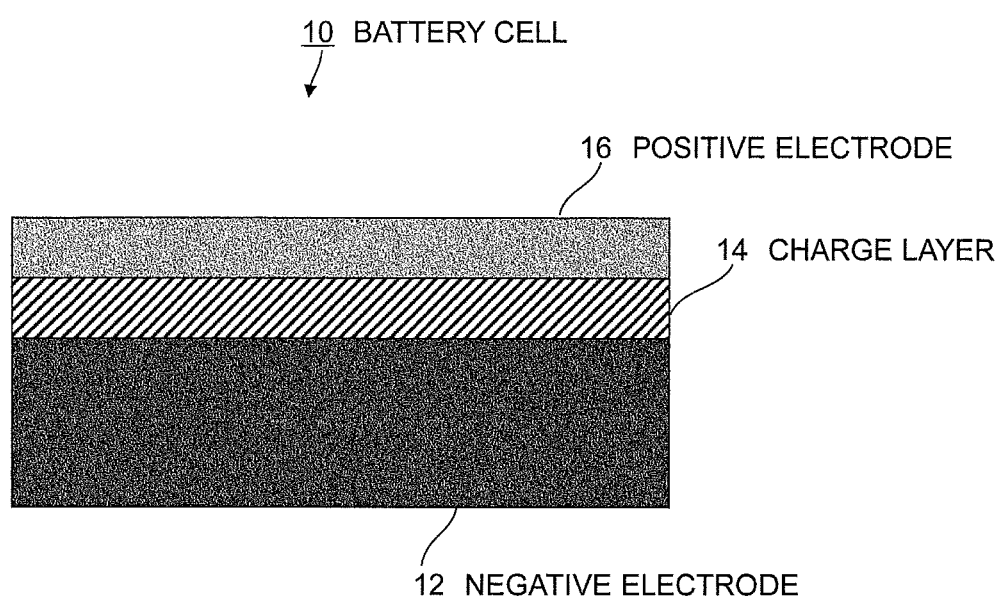
FIG. 1 is view for explaining a battery cell that is a unit of a secondary battery of the present invention.

FIG. 1 illustrates a battery cell 10 being a unit of the all-solid secondary battery to which the present invention is applied. The battery cell 10 has a structure in which a charge layer 14 is sandwiched between a negative electrode 12 and a positive electrode 16. The negative electrode 12 and the positive electrode 16 are conductive layers and may be made of the same material and decided to be positive and negative corresponding to the charge layer 14. The battery cell may be formed utilizing a substrate such that the negative electrode, the charge layer and the positive electrode are formed using thin films on the substrate. The present invention, however, has an object to provide a secondary battery with a thickness suppressed as much as possible for high-density packaging, and therefore the negative electrode is a conductive sheet that serves also as the substrate. On the conductive sheet, the charge layer and the positive electrode are formed by the sputtering, the vapor deposition or the like. The positive electrode is formed of metal or ITO (indium tin oxide) excellent in conductivity.

As a matter of course, the conductive sheet may be used as the positive electrode, and the charge layer and the negative electrode may be formed thereon by the sputtering, the vapor deposition or the like. However, the following description will be made for the case of using the conductive sheet as the negative electrode for simplification of description.

There are various structures in the charge layer depending on the system, which do not limit the configuration of the charge layer. For example, in the all-solid lithium-ion secondary battery, its charge layer 14 is composed of an anode active material, an ion-conducting inorganic material (solid electrolyte) and a cathode active material, and is sandwiched between the negative electrode (anode current collector) 12 and the positive electrode (cathode current collector) 16. Further, the present inventors disclose the all-solid secondary battery in which the charge layer 14 is composed of an n-type metal oxide semiconductor layer that is insulation-coated with atomized titanium oxide and a p-type metal oxide semiconductor layer as a blocking layer on the positive electrode side.

Figure 2:
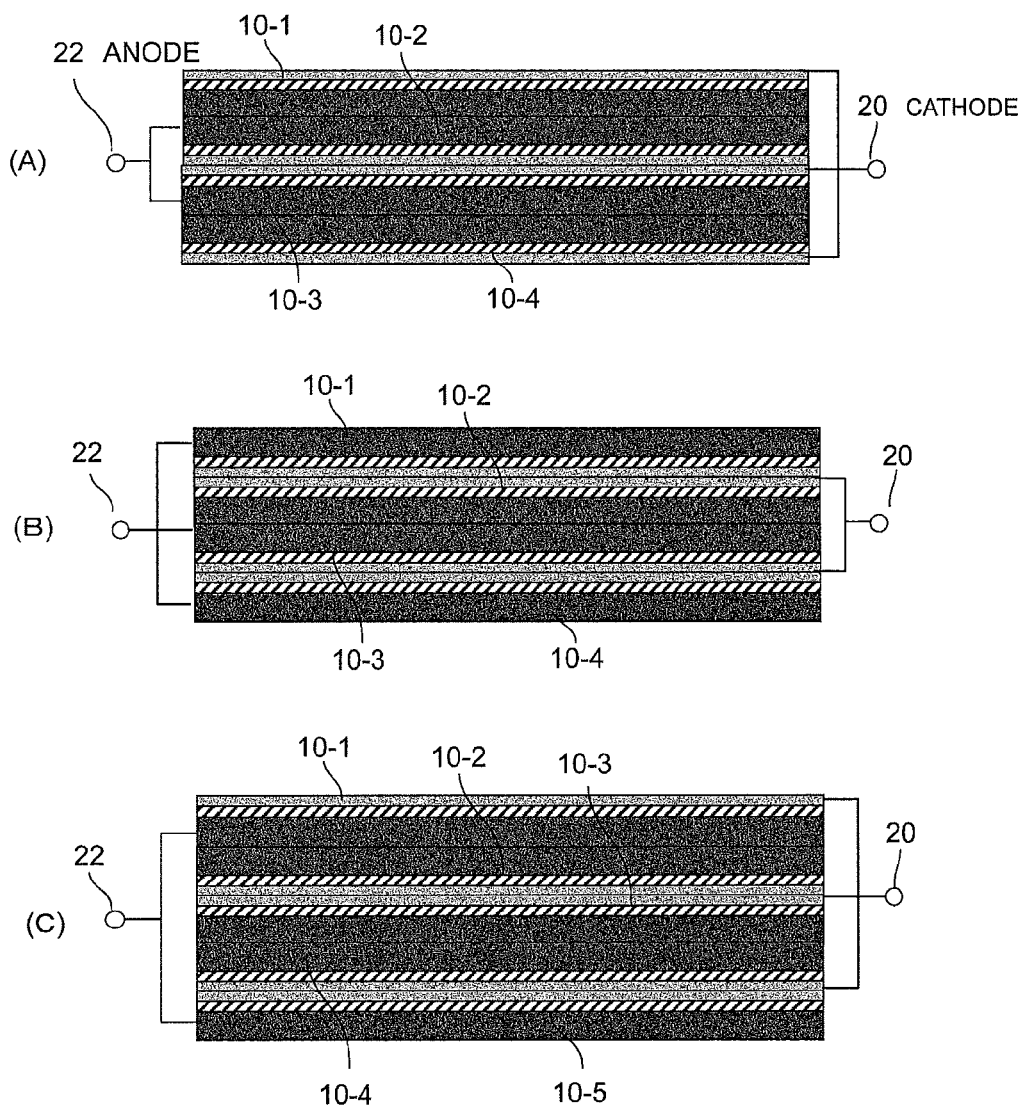
FIG. 2 is a view for explaining various stacked structures of the battery cells.

FIG. 2 illustrates various stacked structures 18 of the battery cells. FIG. 2(A) is a stack example using upper and lower planes as positive electrodes. A battery cell 10-1 and a battery cell 10-2 are connected with each other at their negative electrodes, the battery cell 10-2 and a battery cell 10-3 are connected with each other at their positive electrodes, and the battery cell 10-3 and a battery cell 10-4 are connected with each other at their negative electrodes.

To bring the physical serial stack into electrical parallel connection, the negative electrodes of the battery cell 10-1 and the battery cell 10-2 and the negative electrodes of the battery cell 10-3 and the battery cell 10-4 are connected together into an anode 22. A cathode 20 connects the positive electrodes of the battery cell 10-2 and the battery cell 10-3 and the two positive electrodes on the upper and lower outermost layer surfaces.

FIG. 2(B) illustrates an example in which the upper and lower outermost layer surfaces are negative electrodes, and FIG. 2(C) illustrates an example in which odd number of battery cells 10-1 to 10-5 are stacked and the upper outermost layer is a positive electrode and the lower outermost layer is a negative electrode. In each of the examples, the electrical parallel connection is realized by connecting the positive electrodes and connecting the negative electrodes, which are separated from on another due to stacking, and any number of stacks and any stacking order are adoptable. In the following description, the stacked structures are properly used as necessary, and the stacked structure may be basically any stacked structure but not limited to the structures which are used in the description.

Figure 3:
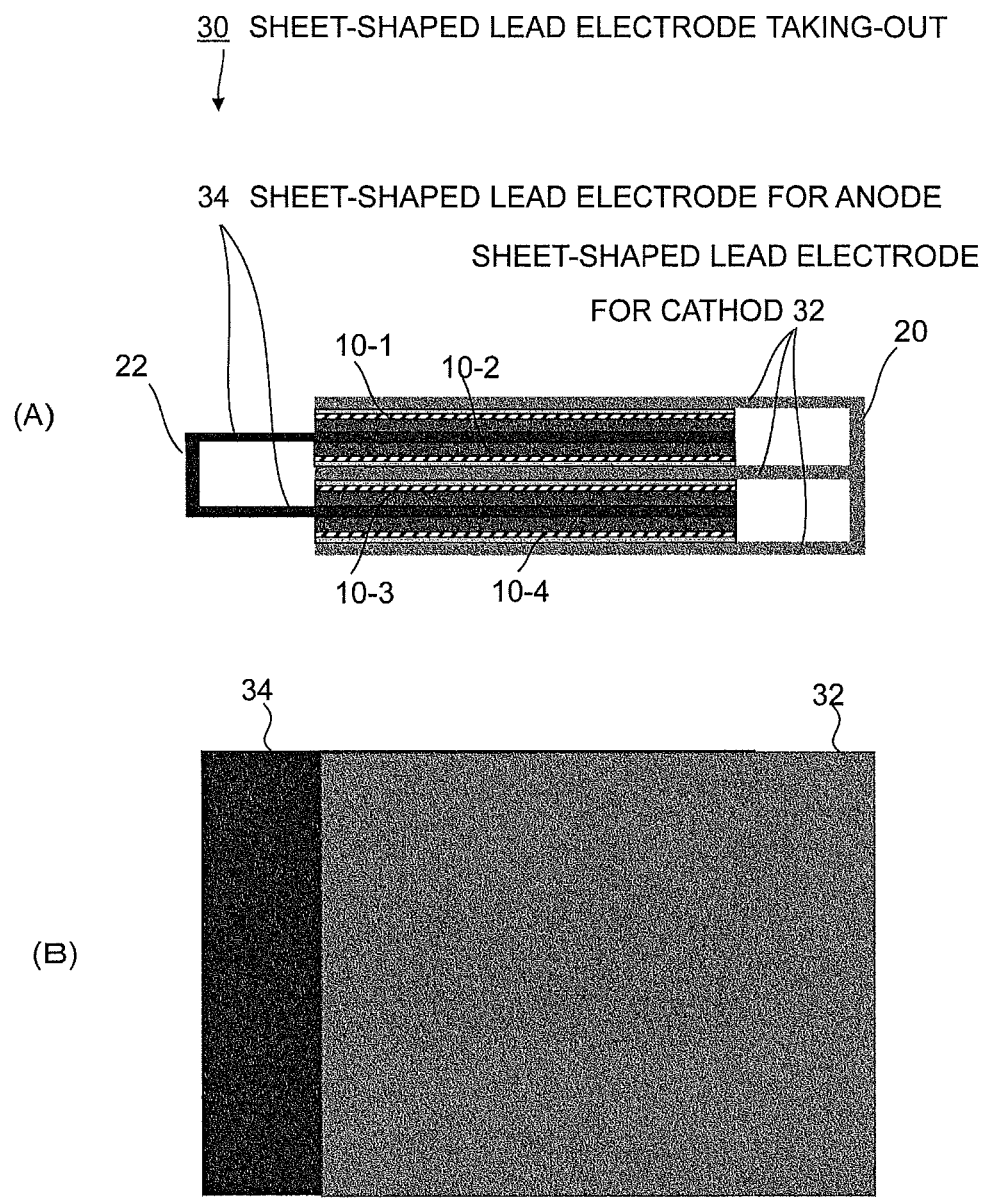
FIG. 3 is a view for explaining a structure of a stacked-type secondary battery by sheet-shaped lead electrodes that electrically connect the stacked battery cells in parallel.

FIG. 3 is a view illustrating a sheet-shaped lead electrode taking-out structure 30, and is a method of establishing connection by holding a sheet between electrode surfaces, which is conventionally performed. FIG. 3(A) illustrates a cross-sectional view and FIG. 3(B) illustrates a plan view. The battery cells 10-1 to 10-4 are stacked with surfaces having the same polarity brought into contact with each other, and, for connecting positive electrodes, sheet-shaped lead electrodes for cathode are arranged on a cathode surface of the battery cell 10-1, on a surface where the cathode surfaces of the battery cell 10-2 and the battery cell 10-3 are in contact with each other, and on a cathode surface of the battery cell 10-4, and the sheet surfaces taken out to the outside of the battery cells are connected together to form the cathode 20. The anode 22 is made by arranging sheet-shaped lead electrodes for anode on a surface where anode surfaces of the battery cell 10-1 and the battery cell 10-2 are in contact with each other, and on a surface where anode surfaces of the battery cell 10-3 and the battery cell 10-4 are in contact with each other, and connecting together the sheet surfaces taken out to the outside of the battery cells.

Since the sheet-shaped lead electrodes are arranged to cover the electrode surfaces of the battery cells, the stacked structure using the sheet-shaped lead electrodes, in which the thickness corresponding to the number of sheet-shaped lead electrodes used is added to the thickness of the stacked battery cells, increases not only in thickness but also in weight by the number of the sheet-shaped lead electrodes.

The present invention provides a structure and an arrangement of lead electrodes with the thickness and the weight suppressed to the minimum even when using the taking-out lead electrodes in order to take out the electrodes of the stacked-type secondary battery for high-density packaging.

Figure 4:
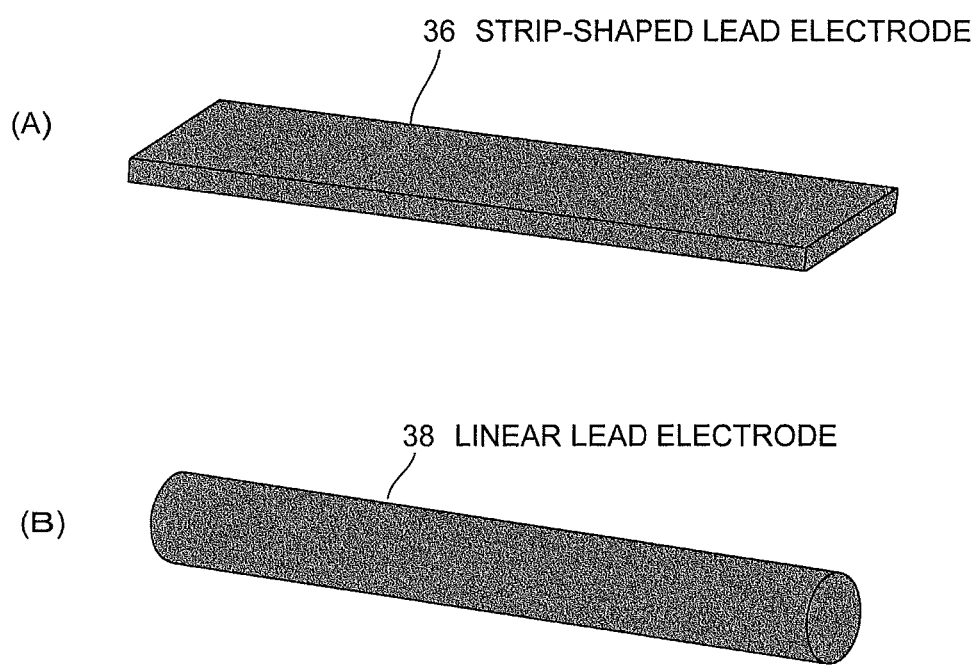
FIG. 4 illustrates a strip-shaped lead electrode and a linear lead electrode used in the present invention.

FIG. 4 illustrates lead electrodes used in the present invention, and FIG. 4(A) illustrates a strip-shaped lead electrode and FIG. 4(B) illustrates a linear lead electrode. Each of them is a lead electrode considerably smaller in width than the electrode surface of the battery cell, and a lead electrode with a length corresponding to a width from an end portion where the electrode is taken out to the outside from the electrode surface of the battery cell to the vicinity of the other end portion.

The strip-shaped lead electrode and the linear lead electrode are preferably made by using a conductive material having a conductivity equal to or lower than the conductivity of an electrode surface material of the battery cell in contact therewith. By arranging the lead electrode from the end portion where the electrode is taken out to the outside to the vicinity of the other end portion, the lead electrode is brought into parallel connection with the electrode of the battery cell. Accordingly, the surface resistance in a region where the lead electrode is arranged decreases so that the current from the electrode surface flows into the arranged lead electrode over its whole length direction.

To decrease the surface resistance at a portion where the lead electrode is arranged so as to prevent loss of energy, it is preferable to use a conductive material which makes the resistivity of the lead electrode for use equal to or lower than the resistivity of the electrode material of the battery cell in contact therewith.

For example, in the case where a sheet made of aluminum as a material is used for the negative electrode 12 of the battery cell illustrated in FIG. 1, the resistivity of aluminum is $2.65 \times 10^{-8}$ $\Omega$m, and therefore the same material or a material having a resistivity lower than that of aluminum is used for the lead electrode. Examples of such material include copper having a resistivity of $2.11 \times 10^{-8}$ $\Omega$m and silver having a resistivity of $1.59 \times 10^{-8}$ $\Omega$m.

For the positive electrode 16, a layer is formed by the sputtering or vapor deposition. In the case of using, for example, ITO (indium tin oxide) whose resistivity is 1.5 to 2.0×10$^{-6}$ Ωm, and therefore brass (having a resistivity of 5 to 7×10$^{-8}$ Ωm), nickel (having a resistivity of 6.99×10$^{-8}$ Ωm), zinc (having a resistivity of 6.02×10$^{-8}$ Ωm), aluminum, or copper which are lower in resistivity than ITO is suitable for the lead electrode material. Further, Nichrome that is an alloy of nickel, iron, and chromium has a resistivity of 1.50×10$^{-6}$ Ωm, and therefore a nichrome wire is usable as the linear lead electrode.

Further, in the case of using zinc oxide as the positive electrode, the resistivity of zinc oxide is 1×10$^{-5}$ Ωm that is higher than that of ITO, and therefore the same material as the examples in the case of using ITO can be used as the material used for the lead electrode.

The lead electrode used in the present invention is not particularly limited to have the cross-sectional shape illustrated in FIG. 4 but may have a cross-sectional shape of a polygon such as triangle or rectangle, an elliptical shape, or any other shape.

Example 1

Figure 5:
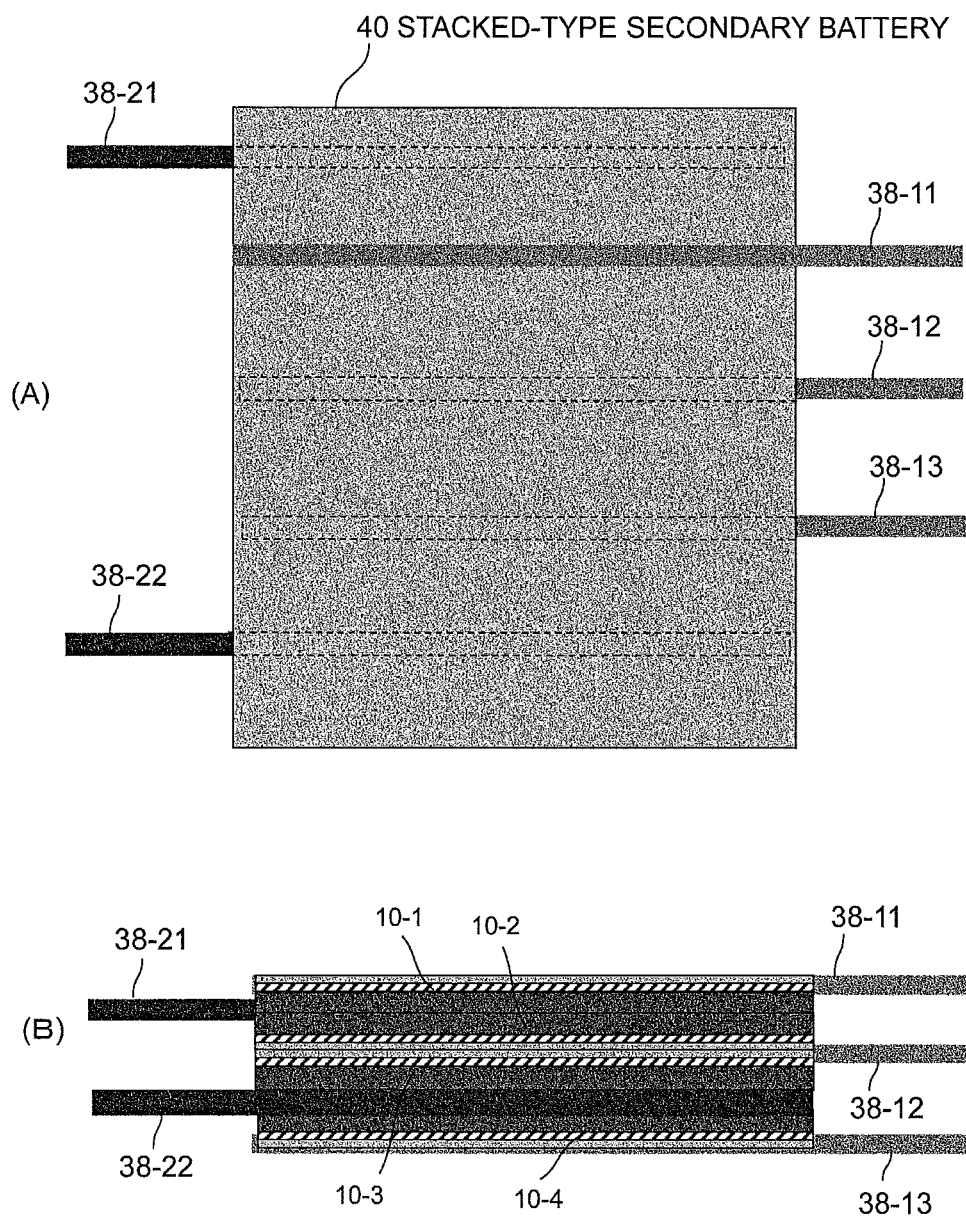
FIG. 5 illustrates a structure of a strip-shaped lead electrode stacked-type secondary battery according to the present invention.

FIG. 5 illustrates an example of a stacked-type secondary battery 40 according to the present invention using the linear lead electrode 38. FIG. 5(A) is a plan view and FIG. 5(B) is a cross-sectional view. The stacked-type secondary battery 40 has the upper and lower outermost surfaces stacked as positive electrodes, in which the battery cell 10-1 and the battery cell 10-2 are connected with each other at their negative electrodes, the battery cell 10-2 and the battery cell 10-3 are connected with each other at their positive electrodes, and the battery cell 10-3 and the battery cell 10-4 are connected with each other at their negative electrodes.

For the connection of the positive electrodes of the stacked battery cells, a linear lead electrode 38-11 and a linear lead electrode 38-13 are arranged on the upper and lower outermost surfaces, and a linear lead electrode 38-12 is arranged at the contact surface where the positive electrodes of the battery cell 10-2 and the battery cell 10-3 are in contact with each other. The negative electrode connection is arranged on the negative electrode contact surface between the battery cell 10-1 and the battery cell 10-2, and on the negative electrode contact surface between the battery cell 10-3 and the battery cell 10-4. The linear lead electrodes are arranged at positions where all of them do not simultaneously overlap one another. This is because overlap of all of the five linear electrodes illustrated in FIG. 5 one another only results in that the thickness corresponding to the number of the lead electrodes is simply added at a thickest portion of the stacked-type secondary battery 40. It is desirable to arrange the linear lead electrodes in a dispersion manner to prevent as much as possible overlapping of them, but if the number of stacks is increased and the linear lead electrodes cannot help being overlapped, their overlapping is suppressed to the minimum.

The linear lead electrodes arranged to be dispersed as illustrated in FIG. 5(A) are pressed to result in an increase in thickness corresponding to merely one linear lead electrode as illustrated in FIG. 5(B). FIG. 5(B) illustrates the cross section of the stacked-type secondary battery 40 where a linear lead electrode 38-22 is arranged, and the thickness in the stacked-type secondary battery 40 merely increases by the thickness of the linear lead electrode 38-22, and this also applies to the other linear lead electrodes.

Figure 6:
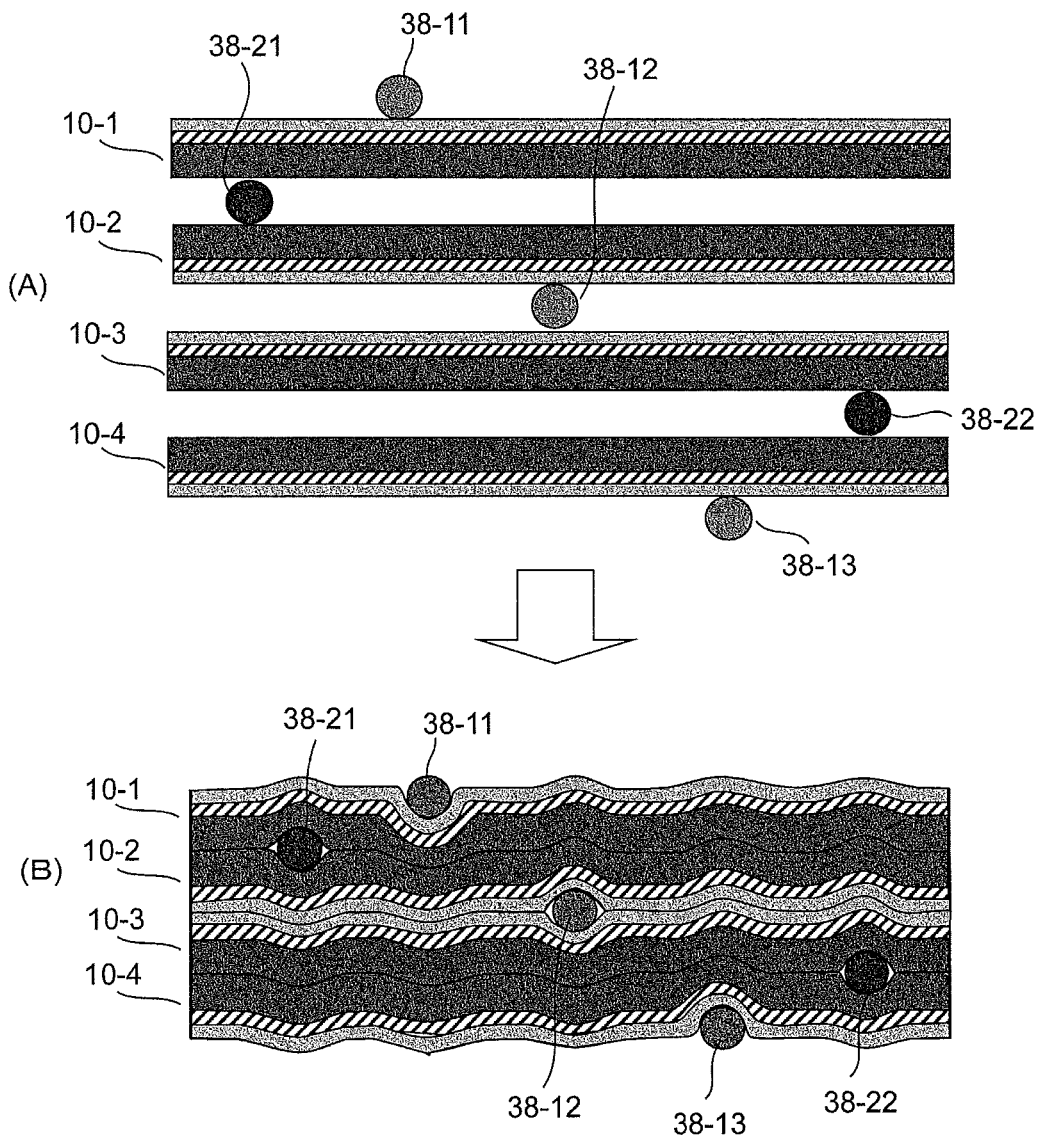
FIG. 6 illustrates a structure of a linear lead electrode stacked-type secondary battery according to the present invention.

FIG. 6 illustrates a cross-sectional view as viewed from the right side surface of the stacked-type secondary battery 40 illustrated in FIG. 5. FIG. 6(A) illustrates a state that the linear lead electrodes 38-11 to 13 for cathode and linear lead electrodes 38-21 to 22 for anode are arranged for the battery cells 10-1 to 4 to be stacked, and FIG. 6(B) illustrates a cross-sectional view after they are pressed in that state to be assembled. Since the linear lead electrodes for cathode and for anode are arranged not to overlap one another in the direction of stacking the battery cells, the thickness of the stacked-type secondary battery increases merely by the thickness of one linear electrode, namely, the diameter of the cross section of the linear electrode.

Another advantage is that the electrode surfaces of the battery cells cover the linear lead electrodes to surround them due to the press, and those portions are thicker than portions with no linear electrodes and thus brought into an excellent contact state because of the pressure concentrated thereon, resulting in no contact resistance.

(Measurement of Contact Resistance)

Figure 7:
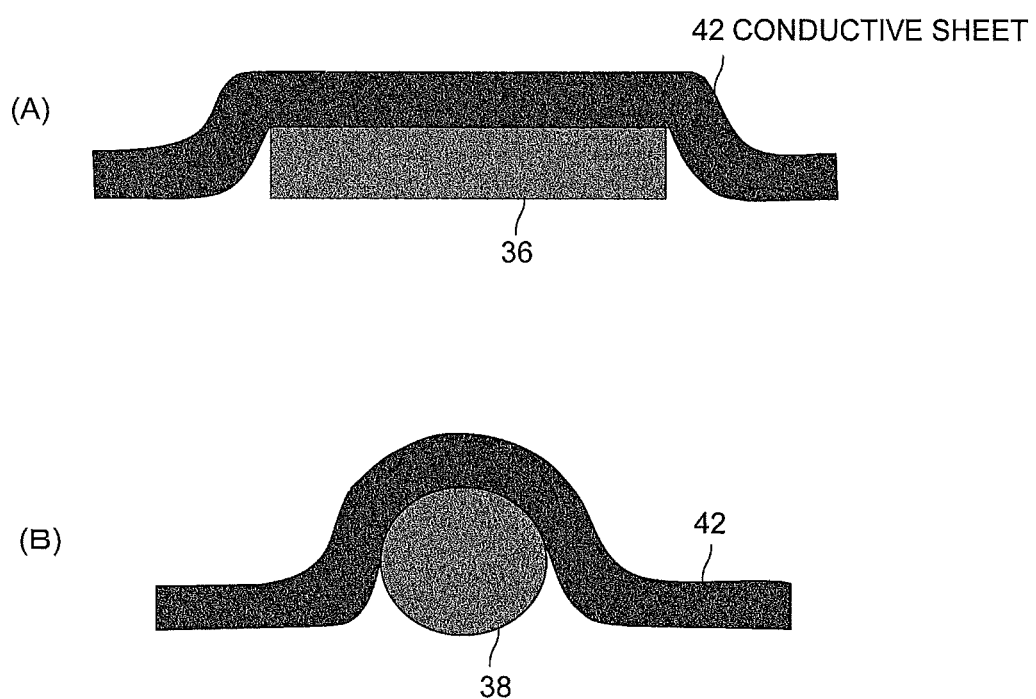
FIG. 7 is a view for explaining contact states of the strip-shaped lead electrode and the linear lead electrode.

FIG. 7 is a view for explaining the contact states between the lead electrodes used in the present invention and the conductive sheet. FIG. 7(A) is a cross-sectional view of the contact state between the strip-shaped lead electrode 36 and a conductive sheet 42, and FIG. 7(B) is a cross-sectional view of the contact state between the linear lead electrode 38 and a conductive sheet 42. FIG. 7 illustrates the cases of wholly pressurizing them from above, in which the strip-shaped lead electrode 36 comes into contact, at the upper surface, with the conductive sheet 42, and the pressure concentrates on the upper surface of the strip-shaped lead electrode 36, resulting in a contact state with excellent close contact. In the case of the linear lead electrode 38, the conductive sheet comes into contact with mainly the upper half of the cross section of the linear lead electrode 38, and the linear lead electrode 38 is pressurized with stronger pressure at an upper side where more excellent close contact can be obtained.

Figure 8:
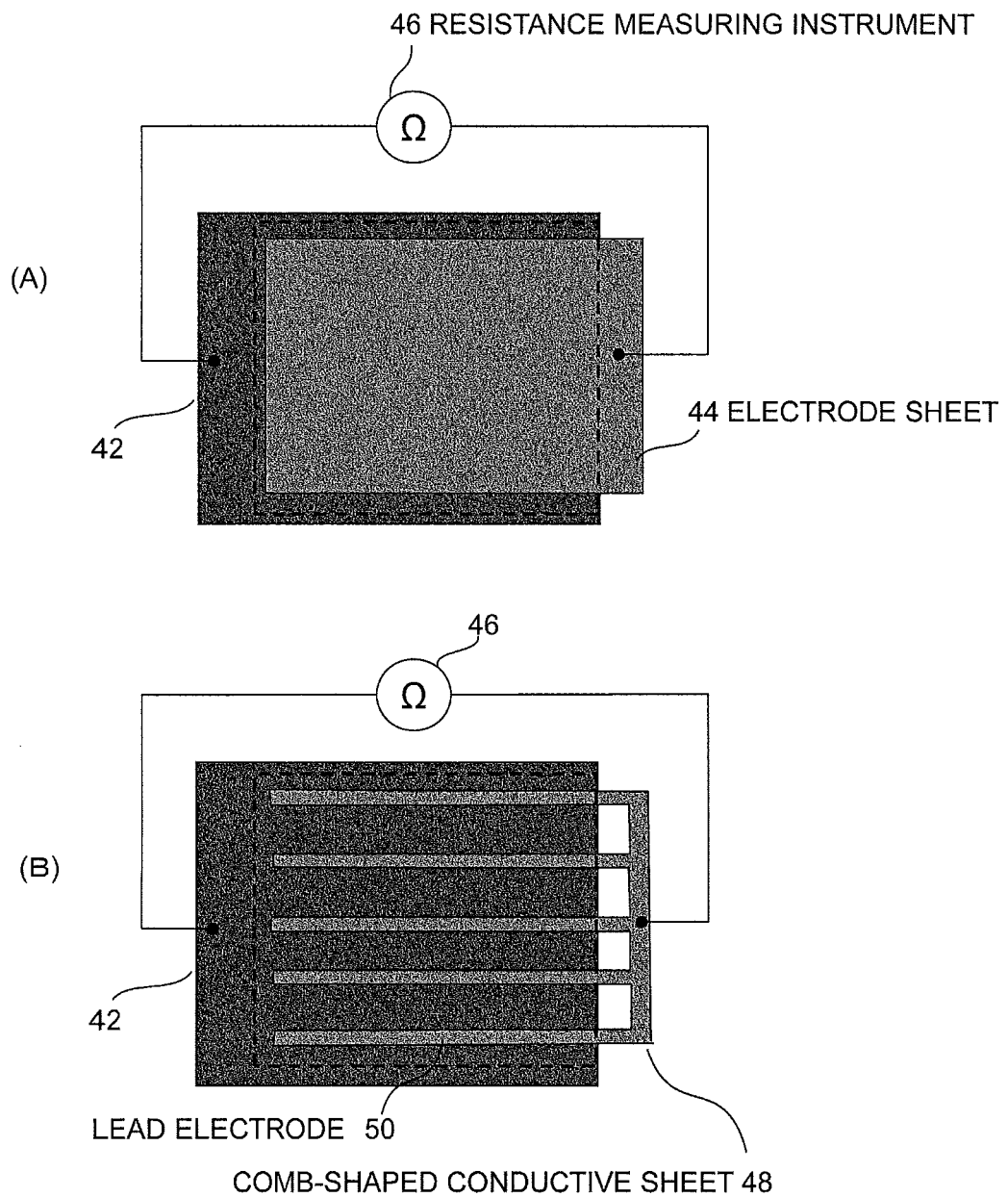
FIG. 8 is a view for explaining a contact resistance measuring method of the sheet-shaped lead electrode and the lead electrode according to the present invention.

FIG. 8 illustrates a measurement method of contact resistance. In FIG. 8(A), an electrode sheet 44 overlaps the conductive sheet 42 and a glass plate is placed in a region indicated with a broken line in the drawing and pressurized with a weight. To the conductive sheet 42 and the electrode sheet 44, a resistance measuring instrument 46 is connected. In FIG. 8(B), a comb-shaped conductive sheet 48 provided with five strip-shaped lead electrodes 50 is used in place of the electrode sheet 44. Other measurement conditions are the same as those in the case of the conductive sheet 44, such as the weight of the weight for pressurization and so on.

For the conductive sheet 42, the electrode sheet 44 and the comb-shaped conductive sheet, aluminum with a thickness of 11 μm is used. The electrode sheet 44 has a width of 70 mm×a length of 90 mm. The comb-shaped conductive sheet 48 is provided with five lead electrodes 50 each of which has a width of 3 mm×a length of 90 mm, at a pitch of 10 mm. The length of a portion where the conductive sheet 42 and the electrode sheet 44 overlap each other at the time of measurement is 70 mm, and the lead electrodes 50 similarly overlap at a length of 50 mm. The weighting from the upper surface is 500 g in each measurement.

Figure 9:
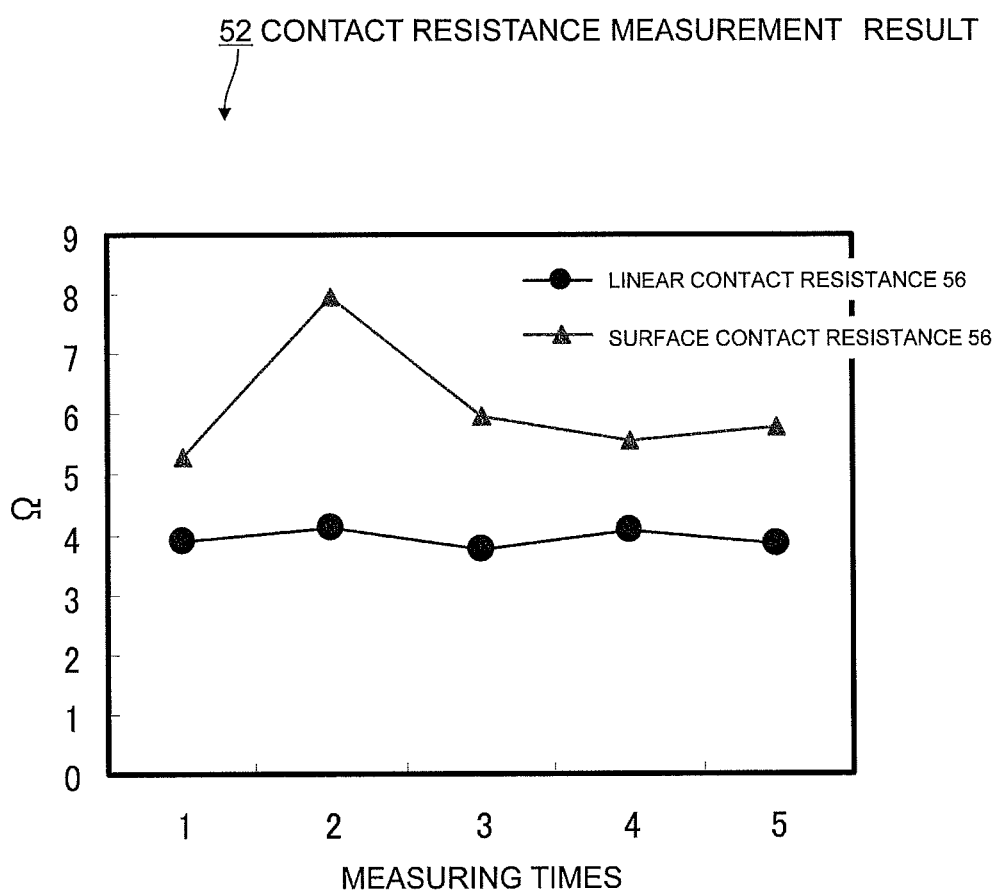
FIG. 9 is a measurement result of the contact resistances.

FIG. 9 illustrates a contact resistance measurement result 52. The measurement result of the electrode sheet 44 in FIG. 8(A) is indicated by a surface contact resistance 54, and the result of the comb-shaped conductive sheet 48 in FIG. 8(B) is indicated by a linear contact resistance 56. The measurement was performed five times for each case and the obtained results were plotted.

As for the surface contact resistance 54, resistance values in a range of about 5Ω to about 8Ω were measured. In contrast, as for the linear contact resistance 56, resistance values were about 4Ω with less variations, resulting in a stable and excellent close contact state.

Example 2

Figure 10:
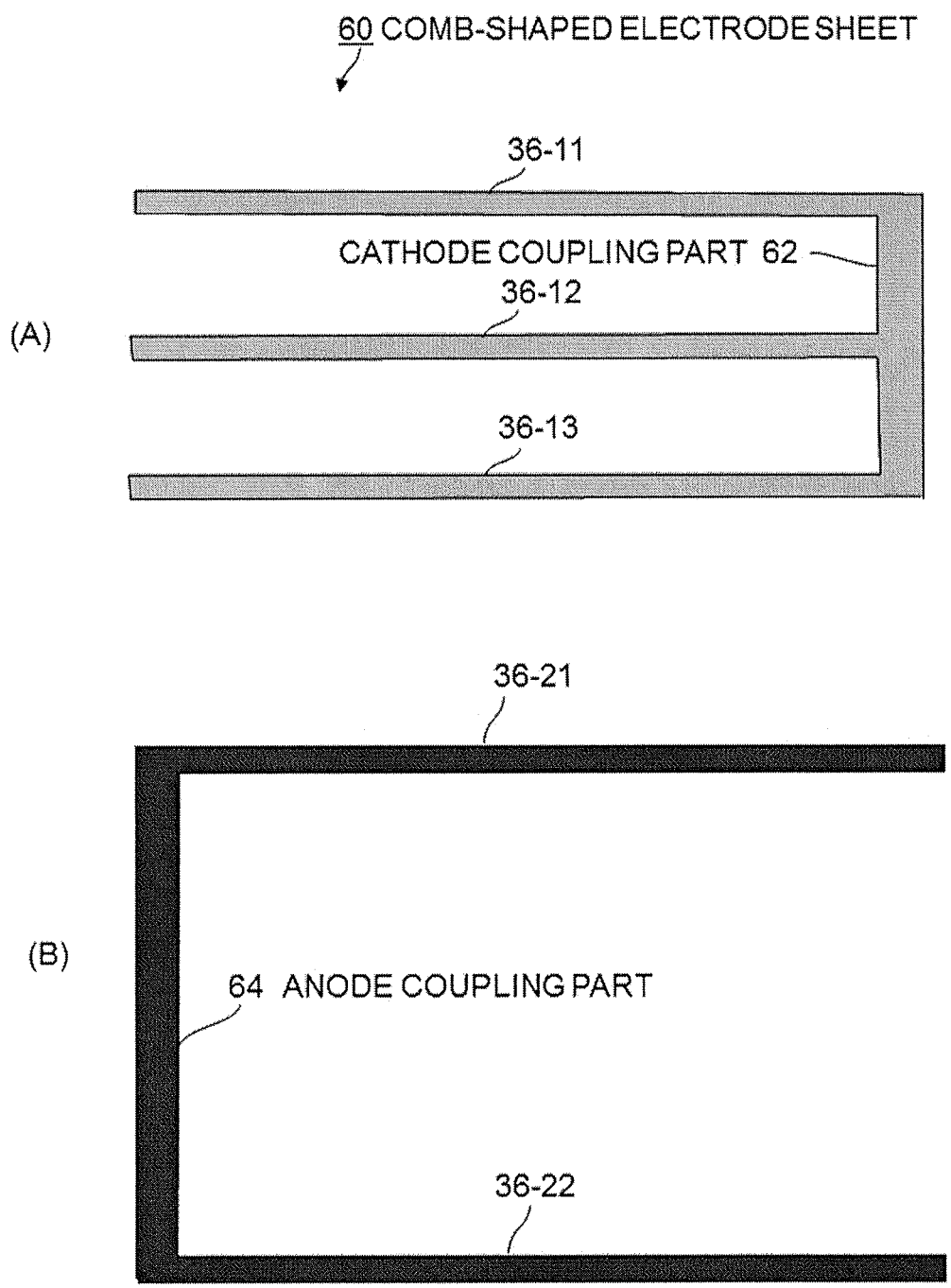
FIG. 10 illustrates a comb-shaped electrode sheet according to the present invention.

FIG. 10 illustrates a comb-shaped electrode sheet. FIG. 10(A) illustrates a comb-shaped electrode sheet for cathode, and FIG. 10(B) illustrates an electrode sheet for anode, which are in shapes for being applied to the stacked-type secondary battery 40 illustrated in FIG. 5. The electrode sheet for cathode is integrally fabricated in a shape in which strip-shaped lead electrodes 36-11, 36-12, 36-13 are connected at a cathode coupling part 62. The comb-shaped electrode sheet for negative electrode is also in a shape in which strip-shaped lead electrodes 36-21, 36-22 are connected at an anode coupling part 64. The electrode sheet made in a shape in which the lead electrodes are integrally formed including the coupling part as described above has a characteristic of facilitating assembly.

The comb-shaped electrode sheet for positive electrode and the comb-shaped electrode sheet for negative electrode may be in the same shape, in which case the lead electrodes are arranged in a manner not to overlap one another at the time of assembly. Further, not only one lead electrode but also a plurality of lead electrodes may be arranged at the contact surface, and the number of lead electrodes can be increased as necessary. The cathode coupling part 62 and the anode coupling part 64 are formed in the shapes simply provided with coupling surfaces in FIG. 10, but can be formed in other arbitrary shapes and may be in shapes conforming to the package state as long as the lead electrodes are connected together respectively.

FIG. 11 illustrates the stacked-type secondary battery 40 using a comb-shaped electrode sheet 60 in FIG. 10. FIG. 11(A) is a plan view, and FIG. 11(B) is a cross-sectional view. In the cross-sectional view, the stacked-type secondary battery 40 is illustrated with the positions of the strip-shaped lead electrodes 36-11, 36-12, 36-13, 36-21, 36-22 displaced so that they are in the cross section, but actually the stacked-type secondary battery 40 increases in thickness only by the thickness of one strip-shaped lead electrode as illustrated in FIG. 5(B).

The comb-shaped lead electrode for cathode is arranged for the positive electrode connection of the stacked battery cells, such that the strip-shaped lead electrode 36-11 and the strip-shaped lead electrode 36-13 are arranged on the upper and lower outermost surfaces, and the strip-shaped lead electrode 36-12 is arranged at the contact surface where the positive electrodes of the battery cell 10-2 and the battery cell 10-3 are in contact with each other. For the negative electrode connection, the strip-shaped lead electrode 36-21 is arranged at the contact surface between the negative electrodes of the battery cell 10-1 and the battery cell 10-2, and the strip-shaped lead electrode 36-22 is arranged at the contact surface between the negative electrodes of the battery cell 10-3 and the battery cell 10-4. The strip-shaped lead electrodes are arranged at positions where all of them do not simultaneously overlap one another. Since the lead electrodes for positive electrode are coupled together and the lead electrodes for negative electrode are coupled together, the stacked-type secondary battery can be easily fabricated only by arranging the strip-shaped lead electrodes and pressing the stacked battery cells into contact with other.

Figure 12:
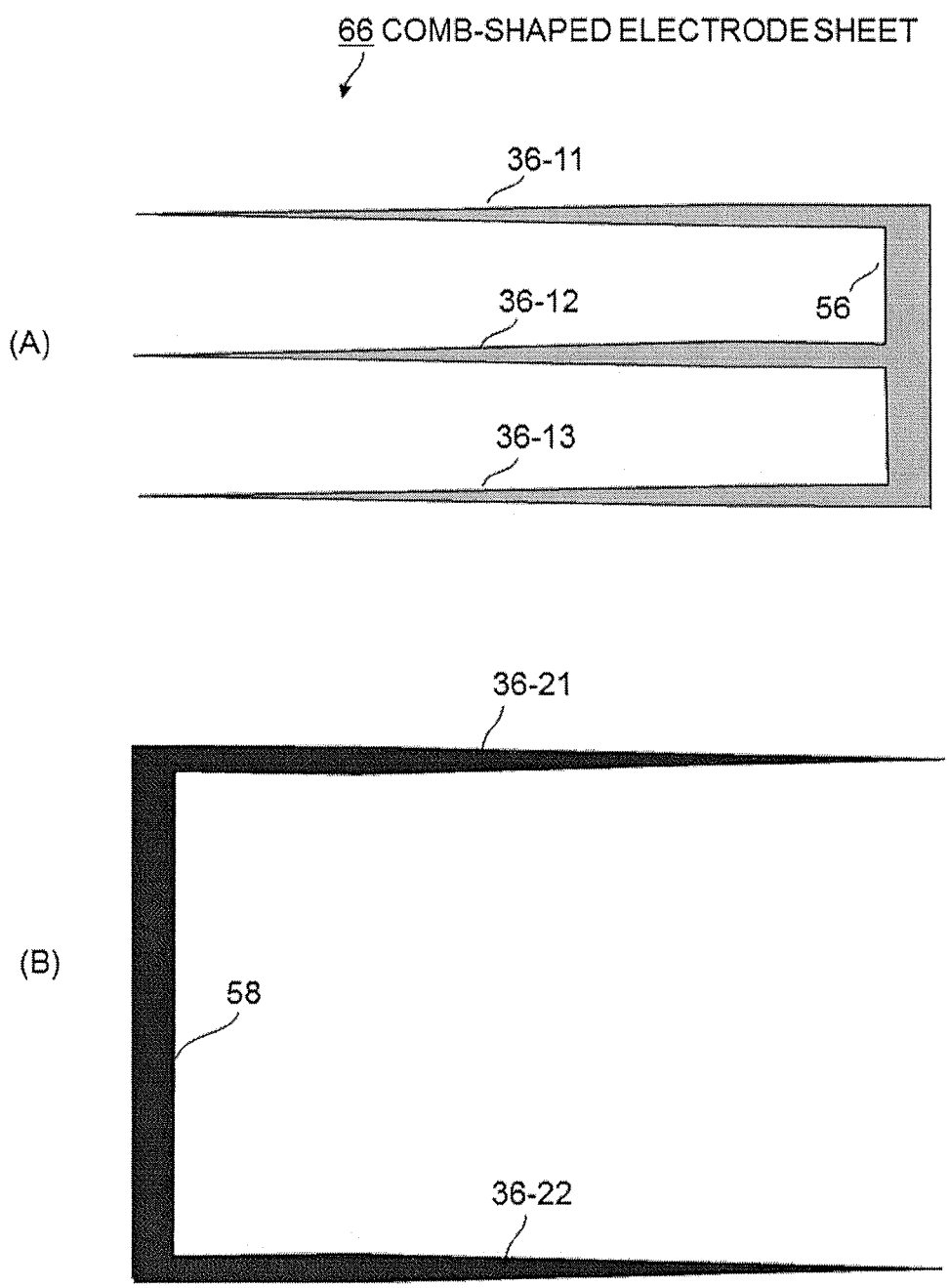
FIG. 12 illustrates a comb-shaped electrode sheet with thinned tip end portions according to the present invention.

FIG. 12 illustrate a comb-shaped electrode sheet 66 provided with strip-shaped lead electrodes with thinned tip end portions as compared with the comb-shaped electrode sheet 60 illustrated in FIG. 10, and can be used in place of the comb-shaped electrode sheet 60. The lead electrodes are connected with the battery cells in parallel with the electrode surfaces thereof, and the resistance in the region decreases. When the lead electrodes are arranged in the width direction with respect the rectangular electrodes, current, namely, movement of electrons, moves toward the lead electrode parts and, when reaching the lead electrodes, then moves to the coupling part through the lead electrodes. Therefore, the number of electrons increases from the tip end portions of the lead electrodes toward the coupling part, and therefore the lead electrode shape increases in width toward the coupling part.

Example 3

Though the lead electrodes are used for taking out the electrodes for cathode and for anode in the stacked-type secondary battery, the conductive sheet also serving as the substrate is used as the negative electrode as described in FIG. 1. Therefore, it is possible to extend the negative electrode from the charge layer part and use it as the taking-out electrode.

Figure 13:
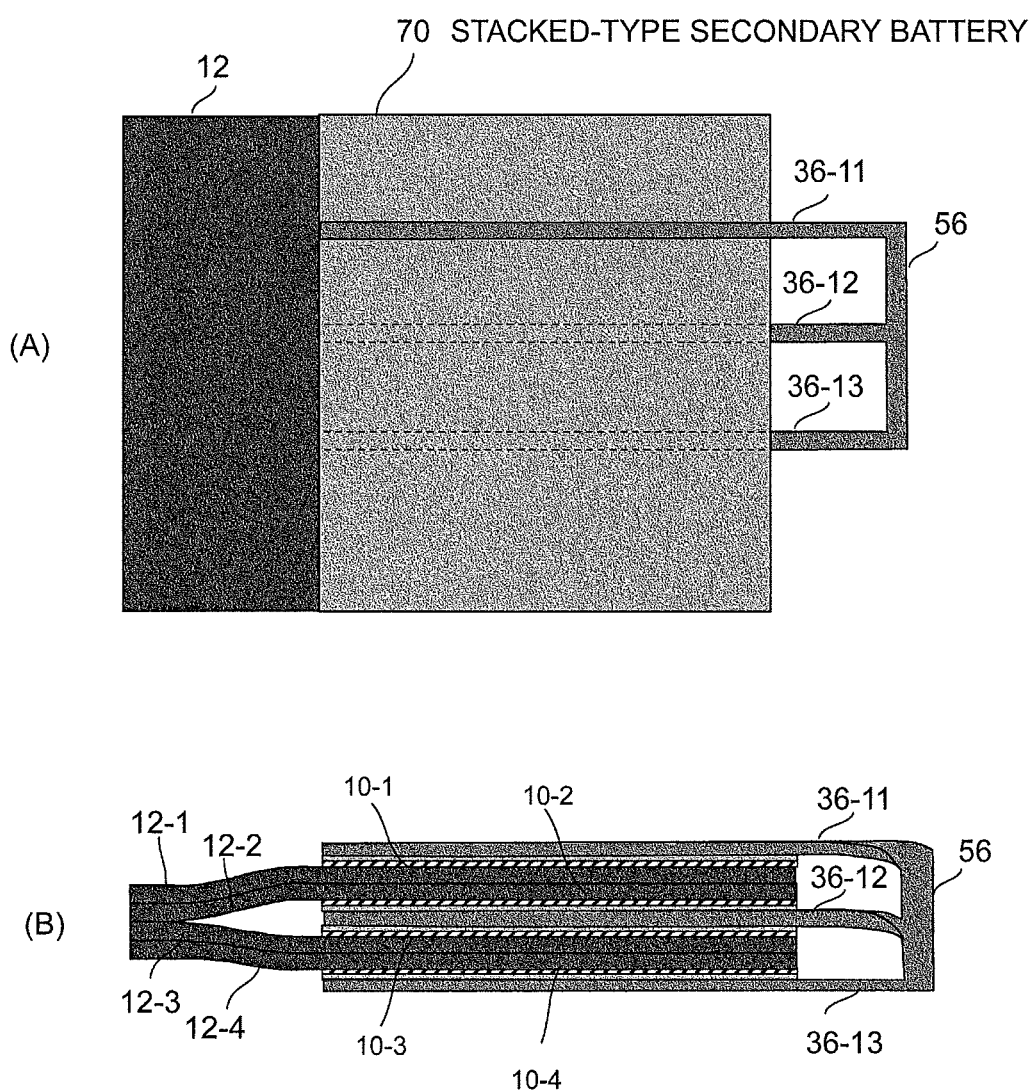
FIG. 13 illustrates a stacked-type secondary battery in which the negative electrodes are extended to overlap each other.

FIG. 13 illustrates a stacked-type secondary battery in which the negative electrodes are extended and used for the taking-out electrodes. FIG. 13(A) is a plan view, and FIG. 13(B) is a cross-sectional view. The cross section of the lead electrode parts for positive electrode is illustrated with the positions of the lead electrodes displaced so as to display their cross-sectional part. The stacked structure of the battery cells is the same as that in FIG. 11, and the taking-out structure of the positive electrode is the same as that described in FIG. 11.

The negative electrodes 12-1, 12-2, 12-3, 12-4 are extended to end portions opposite to the end portions where the positive electrodes are taken out in the battery cells 10-1, 10-2, 10-3, 10-4. The extended portions are brought into contact with each other while overlapping each other as illustrated in FIG. 13(B), whereby anode parts of the battery cells are electrically connected with each other without using lead electrodes.

Example 4

FIG. 14 illustrates a battery cell 80 with taking-out electrode. FIG. 14(A) is a plan view, and FIG. 14(B) is a cross-sectional view. A charge layer 84 is formed in a small region as compared with a conductive negative electrode sheet 82, in a manner to be surrounded by a negative electrode at four sides. The taking-out electrode for the negative electrode is a portion of the negative electrode sheet 82, where the charge layer is not formed. A positive electrode 86 is formed in a region further smaller than the charge layer 84 in a manner to be surrounded by the charge layer.

Figure 15:
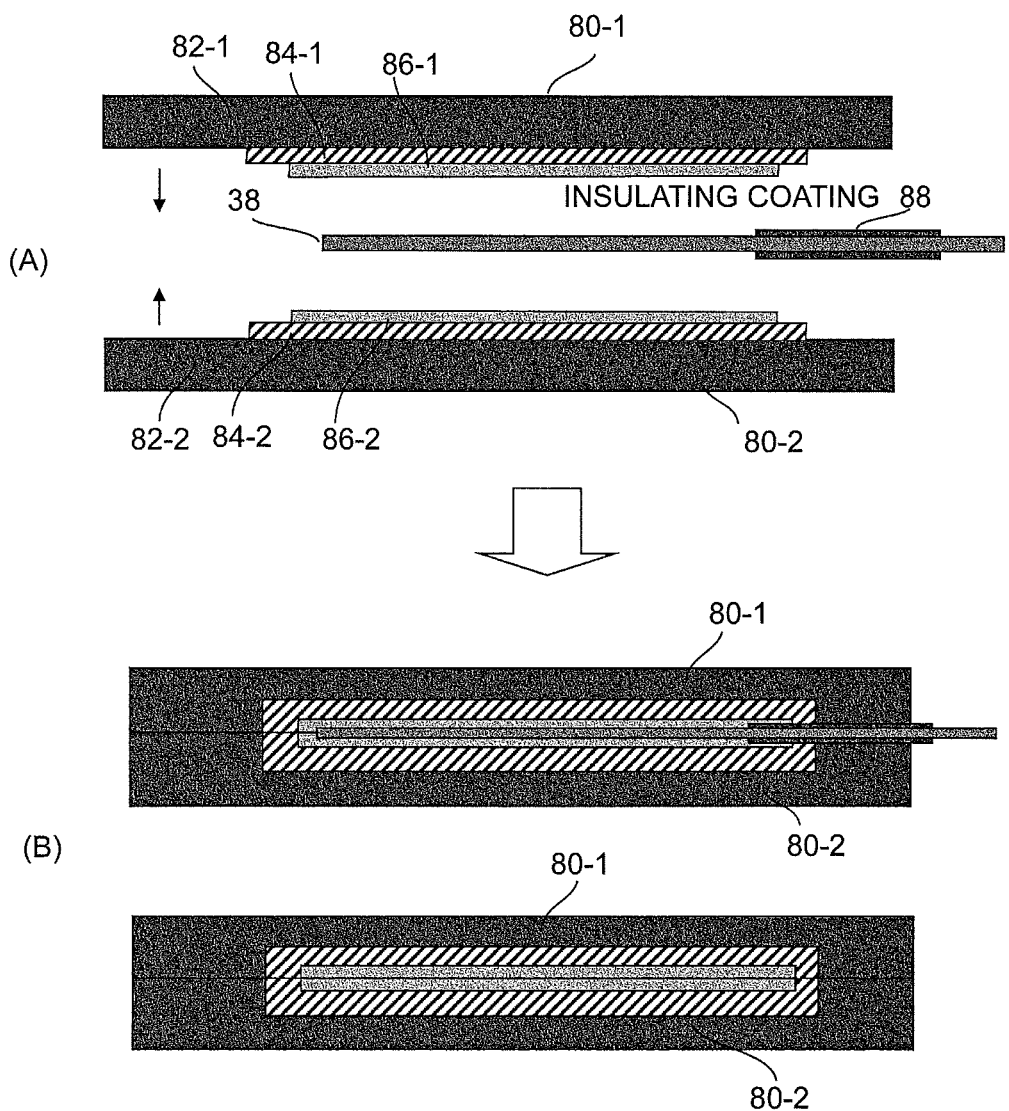
FIG. 15 illustrates a superposed structure of battery cells in which the charge layers and the positive electrodes are made smaller than the negative electrodes.

FIG. 15 is a view for explaining the state of the case where the battery cells 80 with taking-out electrode are superposed one on the other with their positive electrodes 86 opposite each other. In FIG. 15(A), a positive electrode 86-1 of a battery cell 80-1 with taking-out electrode and a positive electrode 86-2 of a battery cell 80-2 with taking-out electrode are opposite each other, and the linear lead electrode 38 is sandwiched between them. At portions of the linear lead electrode 38 which are in contact with the positive electrodes 86-1, 86-2 and charge layers 84-1, 84-2, an insulating coating 88 for preventing short circuit is provided.

FIG. 15(B) illustrates the state after the battery cell 80-1 with taking-out electrode and the battery cell 80-2 with taking-out electrode are stacked and pressed, and is a cross-sectional view of a portion with the linear lead electrode 38, and a cross-sectional view of a portion without the linear lead electrode 38. The positive electrodes 86-1, 86-2 are surrounded by the charge layers 84-1, 84-2, and the charge layers 84-1, 84-2 are further surrounded by the negative electrode sheets. The charge layers 84-1, 84-2 and the positive electrodes 86-1, 86-2 are thin by thinning. By stacking and pressing the battery cell 80-1 with taking-out electrode and the battery cell 80-2 with taking-out electrode, they are substantially made into the state illustrated in FIG. 15(B) with less influenced by the thickness of the charge layers 84-1, 84-2 and the positive electrodes 86-1, 86-2.

In the battery cells 80 with taking-out electrode, the charge layers 84 spread out of the positive electrodes 86 at the time of stacking, so that a portion where the charge layers 84 are in contact with each other exists, but the charge layers 84 are surrounded by the negative electrode sheets 82. Therefore, the battery cells 80 with taking-out electrode have a structure in which the negative electrode sheets 82, the charge layers 84, and the positive electrodes 86 are stacked in order as viewed in the horizontal direction in FIG. 15(B), and thus has a charge function.

In the secondary battery composed of the n-type metal oxide semiconductor layer insulation-coated with atomized titanium oxide as the charge layer 84 and the p-type metal oxide semiconductor layer as the blocking layer on the positive electrode side, the charge function in the horizontal direction is confirmed and enables good use of the charge layer.

The structure of the battery cells 80 with taking-out electrode does not require the positional accuracy for superposition in stacking them, and even if the two battery cells 80 with taking-out electrode are stacked while displaced, the positive electrodes 86 come into surface-contact with each other, thereby causing no problem due to the displacement. Further, in the charge layers 84 when they have been stacked while displaced, for example, the charge layer 84-1 has a region in contact with the other positive electrode 86-2, a portion in contact with the other charge layer 84-2, and a region in contact with the other negative electrode sheet. Also in this case, the displacement causes no problem since the charge layer has the charge function in the horizontal direction as described above, thus providing advantages that the positional accuracy margin increases to enable easy assembly. To increase the capacity of the stacked-type secondary battery, the combination of the two battery cells 80 with taking-out electrode illustrated in FIG. 15 are further stacked and the linear lead electrodes are joined together, resulting in a stacked-type secondary battery.

Example 5

In the all-solid lithium-ion secondary battery, it is particularly necessary to surely shut entry of moisture into the solid electrolyte, and therefore a protective film is provided on the side surface of the charge layer to seal it. As the protective film, nitride such as silicon nitride, resin and so on are generally known. The protective film is insulative, and therefore can be used for the insulating layer not only for the all-solid lithium-ion secondary battery but also for the taking-out electrode of other secondary batteries.

FIG. 16 illustrates a battery cell with insulating layer. FIG. 16(A) is a plan view, and FIG. 16(B) is a cross-sectional view. The charge layer 84 and the positive electrode 86 are formed in a region smaller than the negative electrode sheet 82, and an insulating layer 92 is provided to surround the side surfaces of the charge layer 84 and the positive electrode 86. The insulating layer 92 is provided to extend to the taking-out side of the positive electrode in a manner to cover the side surface of the end portion of the negative electrode 82.

Figure 17:
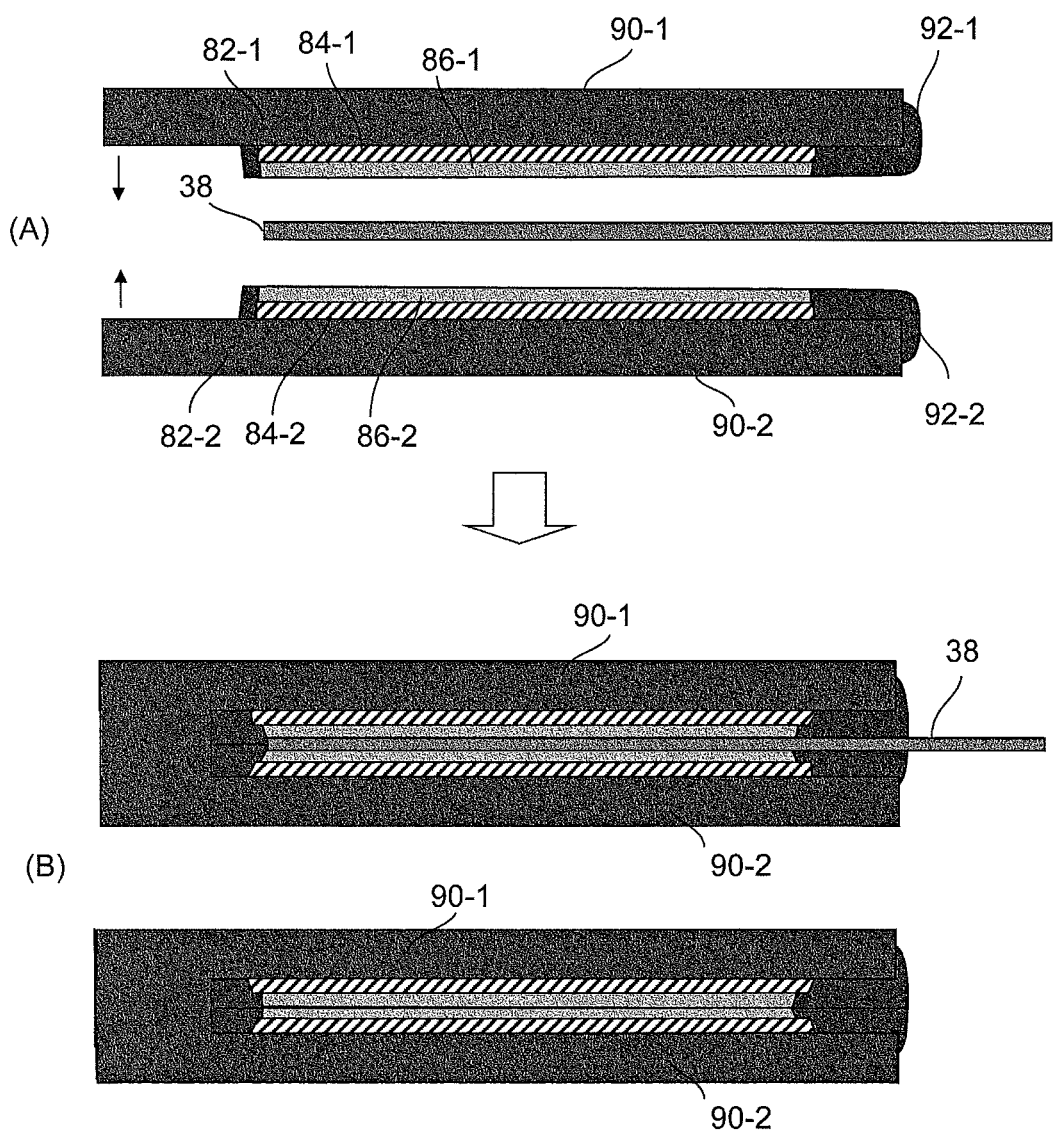
FIG. 17 illustrates a superposed structure of battery cells in which parts of taking-out an internal electrode are coated with insulating layers.

FIG. 17 is a view for explaining the state of the case where battery cells 90 with insulating layer are superposed one on the other with their positive electrodes 86 opposite each other. FIG. 17(A) illustrates a state that a positive electrode 86-1 of a battery cell 90-1 with insulating layer and a positive electrode 86-2 of a battery cell 90-2 with insulating layer are opposite each other, and the linear lead electrode 38 is sandwiched between them. The linear lead electrode 38 is arranged at a region covered by insulating layers 92-1, 92-2, and therefore does not need to have an insulating coating.

FIG. 17(B) illustrates the state after the battery cell 90-1 with insulating layer and the battery cell 90-2 with insulating layer are stacked and pressed, and is a cross-sectional view of a portion with the linear lead electrode 38, and a cross-sectional view of a portion without the linear lead electrode 38. Since the positive electrodes 86-1, 86-2 and the charge layers 84-1, 84-2 are surrounded by the insulating layers 92-1, 92-2, and the linear lead electrode 38 is also surrounded by the insulating layers 92-1, 92-2, the linear lead electrode 38 never short-circuits with other layers. The combination of the two battery cells 90 with insulating layer illustrated in FIG. 17 are further stacked and the linear lead electrodes are joined together, resulting in a stacked-type secondary battery.

Example 6

The linear lead electrode, which is a thin wire, can be easily increased in length and can be easily handled, and therefore the linear lead electrode can be used as a taking-out electrode common to a plurality of stacked-type secondary batteries.

FIG. 18 illustrates a fabrication example of the stacked-type secondary batteries having lead electrodes common to the two stacked-type secondary batteries. FIG. 18(A) is a plan view, and FIG. 18(B) is a cross-sectional view as viewed from the right side surface of a stacked-type secondary battery 40-1 in (A). Though two stacked-type secondary batteries are illustrated here, not only two but also any number of stacked-type secondary batteries having lead electrodes common to them can be arranged.

The fabrication method is easy, in which a linear lead electrode 38-23 is first linearly stretched and two battery cells are placed thereon in parallel in the example of FIG. 18. The stacked-type secondary battery 40-1 and the stacked-type secondary battery 40-2 can be fabricated in parallel by the same work. Therefore, explaining the stacked-type secondary battery 40-1, the battery cell 14 is placed on the linear lead electrode 38-23, then the linear lead electrode 38-12 is placed, and the battery cell 10-13 is placed. With the same process, the linear lead electrode 38-22, the battery cell 10-12, the linear lead electrode 38-11, the battery cell 10-11, and the linear lead electrode 38-21 are placed in order. Finally, they are pressurized to complete the stacked-type secondary battery 40-1 and the stacked-type secondary battery 40-2.

In such a manner, a plurality of stacked-type secondary batteries having linear lead electrodes common thereto can be simultaneously fabricated, and they can be used as stacked type secondary batteries connected in parallel and as individual stacked-type secondary batteries by cutting the common linear lead electrodes, thus enabling mass production.

Example 7

FIG. 19 illustrates a fabrication example of the stacked-type secondary batteries with insulating layer having linear lead electrodes common thereto using battery cells with insulating layer. FIG. 19(A) is a plan view, and FIG. 19(B) is a cross-sectional view of a stacked-type secondary battery 94-1. The stacked-type secondary batteries 94-1, 94-2 with insulating layer are fabricated such that insulating layers 92-11, 92-12 of battery cells 90-11, 90-12, 90-13, 90-14, 90-15 with insulating layer are extended to both ends, and the linear lead electrodes 38-11, 38-12, 38-13 for cathode are made common to the stacked-type secondary batteries 94-1, 94-2. Since the negative sheet also serves to take out the negative electrode, it is unnecessary to individually take out the negative electrode in both of the stacked-type secondary battery 94-1 with insulating layer and the stacked-type secondary battery 94-2 with insulating layer. However, the linear lead electrode 38-21 is necessary which connects the negative electrodes of the stacked-type secondary battery 94-1 with insulating layer and the stacked-type secondary battery 94-2 with insulating layer.

The linear lead electrode 38-21 connecting the negative electrodes is located at the uppermost surface of the negative electrode taking-out part in FIG. 19, but may be located at any contact surface of the stacked battery cells 90-11, 90-12, 90-13, 90-14, 90-15 with insulating layer in the stacked-type secondary battery 94-1. As a matter of course, the linear lead electrode 38-21 never overlaps the linear lead electrodes 38-11, 38-12, 38-13 for positive electrode.

The example in which the linear lead electrodes are made common using the battery cells with insulating layer has been described, in which case the linear lead electrode 38-21 connecting the negative electrodes of the stacked-type secondary batteries is also unnecessary when they are used as individual stacked-type secondary batteries after fabrication.

Example 8

Figure 20:
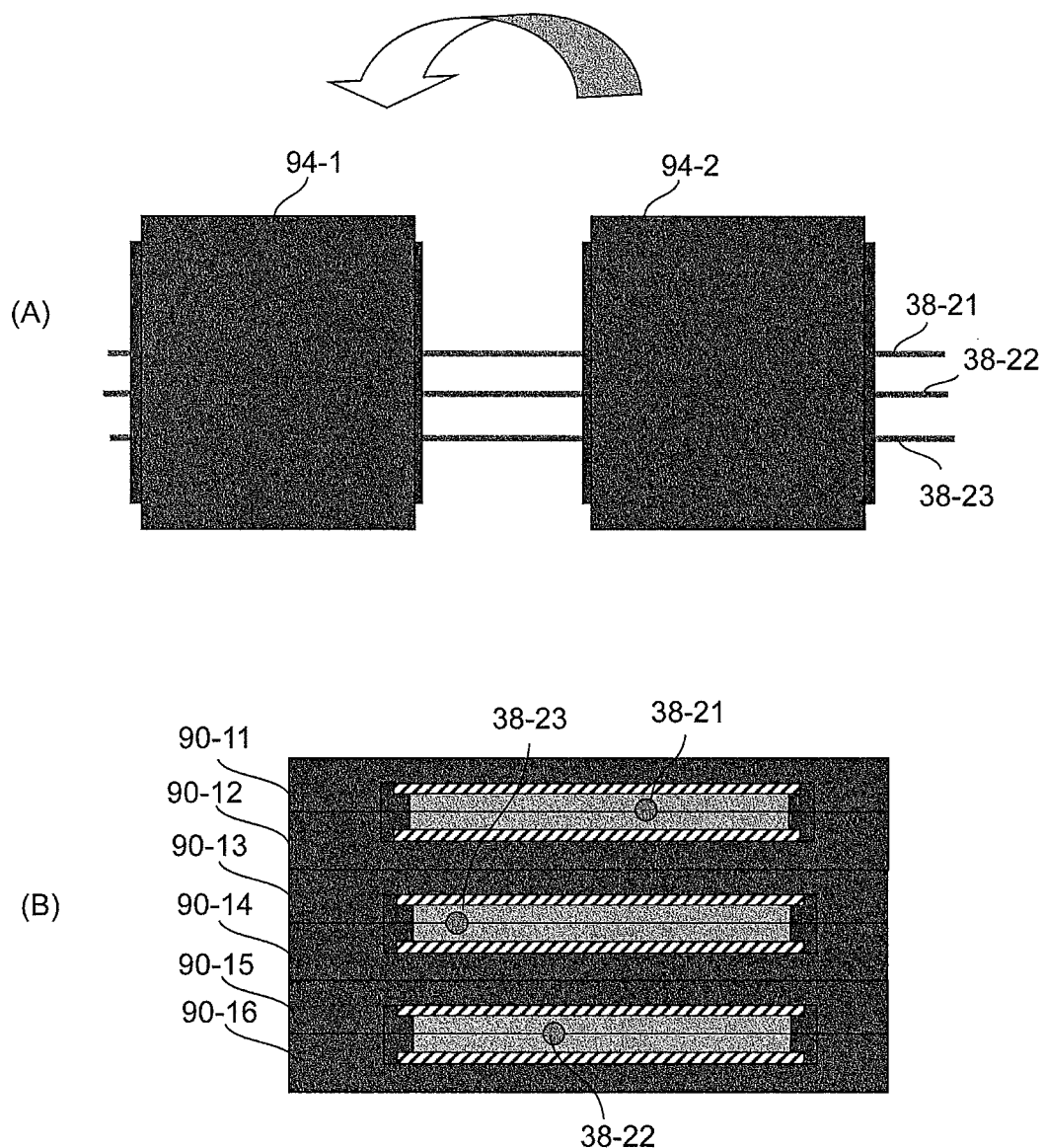
FIG. 20 is a view for explaining a superposed structure in which a plurality of stacked-type secondary batteries having lead electrodes common thereto are folded and superposed one on the other.
Figure 22:
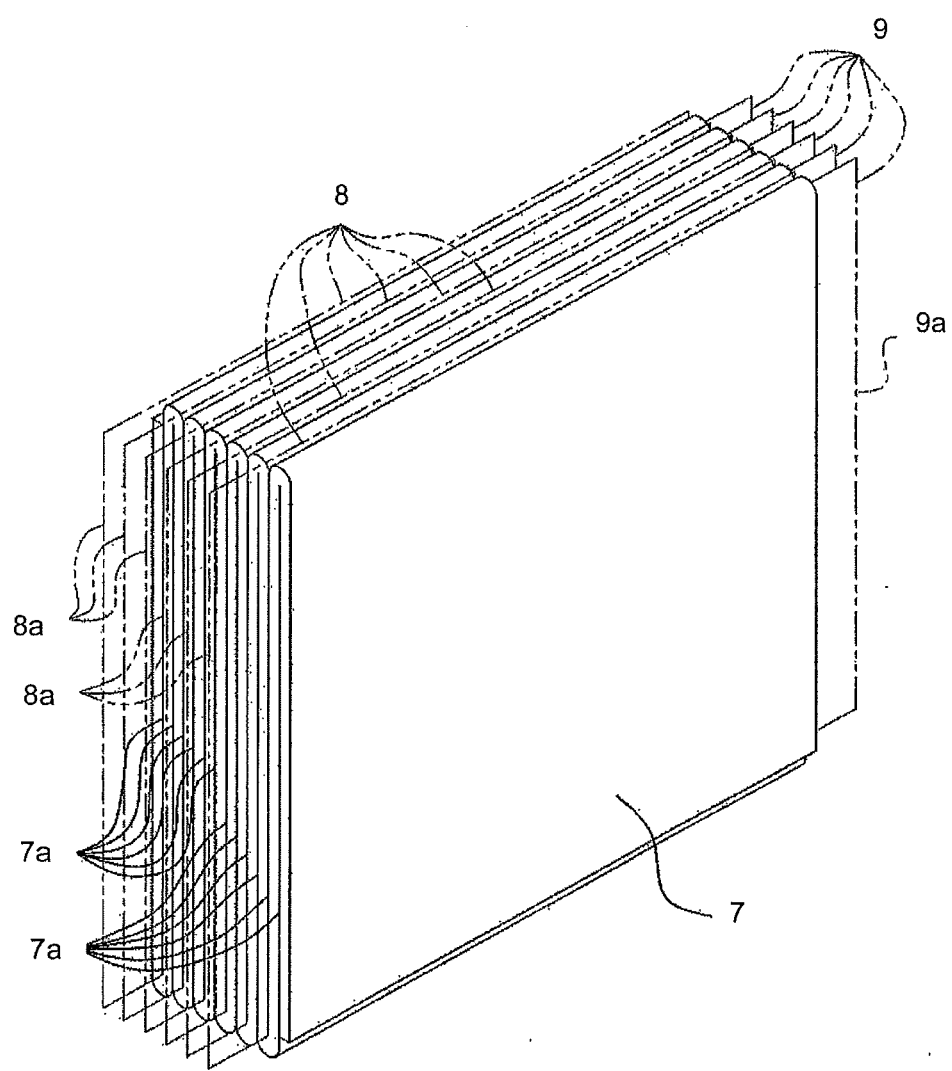
FIG. 22 illustrates a conventional example of a stacked structure of a lithium-ion secondary battery using a gelatinous electrolyte.
Figure 23:
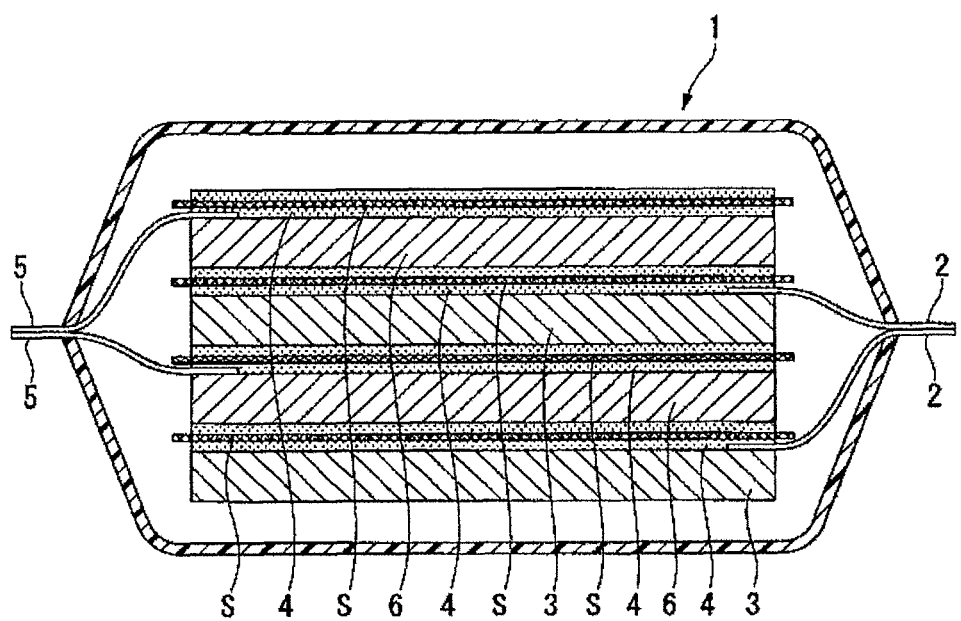
FIG. 23 illustrates a conventional example of a stacked structure of a lithium-ion secondary battery.
Figure 24:
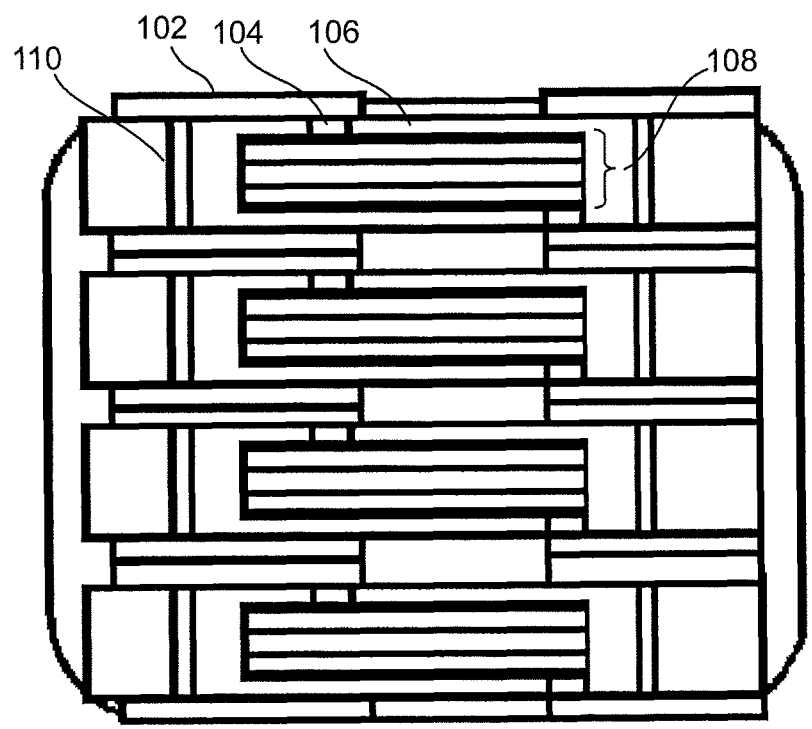
FIG. 24 illustrates a conventional example of a stacked structure of a solid secondary battery.

FIG. 20 illustrates a fabrication example of the stacked-type secondary batteries with insulating layer in the case where the stacked-type secondary batteries with insulating layer are stacked and electrically connected in parallel to greatly increase the capacity. FIG. 20(A) is a plan view, and FIG. 20(B) is a cross-sectional view of the stacked-type secondary battery 94-1 with insulating layer. FIG. 20(A) illustrates two stacked-type secondary batteries 94-1, 94-2 with insulating layer. By folding the linear lead electrodes 38-21, 38-22, 38-23 for positive electrodes, a plurality of stacked-type secondary batteries with insulating layer can be stacked like an accordion, for which the stacked-type secondary batteries with insulating layer corresponding to the number of stacks are simultaneously fabricated.

The stacked-type secondary battery 94-1 with insulating layer is fabricated such that the insulating layer 92-1 of the battery cell 90-11 with insulating layer is extended to both ends, and insulating layers of the stacked battery cells 90-11, 90-12, 90-13, 90-14, 90-15, 90-16 with insulating layer are similarly extended to both ends of the negative electrode sheets. The stacked-type secondary battery 94-2 with insulating layer also has the same configuration. As illustrated in FIG. 20, the individual stacked-type secondary batteries with insulating layer are further stacked, in which the battery cells with insulating layer are stacked such that the negative electrodes of the stacked-type secondary batteries with insulating film to be stacked are connected with each other, and the outermost layers on both sides are negative electrodes. This structure enables connection between the negative electrodes only by stacking the battery cells.

FIG. 21 is a view illustrating the state that the two stacked-type secondary batteries with insulating layer illustrated in FIG. 20 are folded and stacked. FIG. 21(A) is a cross-sectional view illustrating the linear lead electrodes of the stacked stacked-type secondary batteries with insulating layer, in which positions of cross sections are displaced to match the positions of the linear lead electrodes. FIG. 21(B) is a cross-sectional view as viewed from the right side surface in FIG. 21(A). The stacked-type secondary battery 94-2 with insulating layer is folded and stacked on the stacked-type secondary battery 94-1 with insulating layer, and the outermost layers being negative electrodes are connected with each other. The linear lead electrodes 38-21, 38-22, 38-23 for positive electrode are connected at any position to form a cathode where all of positive electrodes are connected together.

Since the stacked-type secondary battery 94-2 with insulating layer is folded and stacked on the stacked-type secondary battery 94-1 with insulating layer, the stacked-type secondary battery 94-1 with insulating layer and the stacked-type secondary battery 94-2 with insulating layer are brought into a symmetric positional relation with respect to the contact surface, and the battery cells 90-21, 90-22, 90-23, 90-24, 90-25, 90-26 with insulating layer are brought into a symmetric relation with the battery cells 90-11, 90-12, 90-13, 90-14, 90-15, 90-16 with insulating layer. Therefore, the linear lead electrodes 38-21, 38-22, 38-23 are located at the positions where they overlap each other respectively so that two linear lead electrodes exist at the same position. In this positional relation, the thickness increases at the position where the linear lead electrodes overlap each other. To avoid such a situation, it is only necessary to displace, at least by the distance corresponding to the linear lead electrode, the position of the stacked-type secondary battery 94-2 with insulating layer to be folded and stacked.

Though the embodiments of the present invention have been described above, the present invention includes appropriate modifications without impairing its object and advantages and is not limited by the above embodiments.

EXPLANATION OF CODES 10, 10-1, 10-2, 10-3, 10-4, 10-5 battery cell
12, 12-1, 12-2, 12-3, 12-4 negative electrode
14 charge layer
16 positive electrode
18 various stacked structures of battery cells
20 cathode
22 anode
30 sheet-shaped lead electrode taking-out
32 sheet-shaped lead electrode for cathode
34 sheet-shaped lead electrode for anode
36 strip-shaped lead electrode
38, 38-11, 38-12, 38-13, 38-21, 38-22 linear lead electrode
40 stacked-type secondary battery
42 conductive sheet
44 electrode sheet
46 resistance measuring instrument
48 comb-shaped conductive sheet
50 lead electrode 52 contact resistance measurement result
54 surface contact resistance
56 linear contact resistance
60, 66 comb-shaped electrode sheet
62 cathode coupling part
64 anode coupling part
70 stacked-type secondary battery
80, 80-1, 80-2 battery cell with taking-out electrode
82, 82-1, 82-2 negative electrode sheet
84, 84-1, 84-2 charge layer
86, 86-1, 86-2 positive electrode
88 insulating coating
90, 90-1, 90-2 battery cell with insulating layer
92, 92-1, 92-2 insulating layer
94 stacked-type secondary battery with insulating layer

What is claimed is:

1. A stacked-type secondary battery made by stacking a plurality of battery cells each in a planar shape having a charge layer that stores electricity sandwiched between a negative electrode and a positive electrode,
wherein adjacent battery cells are stacked such that negative electrodes thereof are in contact with each other and positive electrodes thereof are in contact with each other,
wherein a taking-out lead electrode that is smaller than a negative electrode surface or a positive electrode surface is sandwiched at least either between two negative electrodes in contact with each other or between two positive electrodes in contact with each other, and
wherein lead electrodes sandwiched between electrodes of different layers are arranged such that there is no region where all of the lead electrodes simultaneously overlap one another as viewed from a surface where the lead electrode is taken out.

2. The stacked-type secondary battery according to claim 1,
wherein the lead electrode sandwiched between the electrodes comprises one lead electrode or a plurality of lead electrodes.

3. The stacked-type secondary battery according to claim 1,
wherein the lead electrode sandwiched between the electrodes is in a linear shape.

4. The stacked-type secondary battery according to claim 1,
wherein the lead electrode sandwiched between the electrodes is in a strip shape.

5. The stacked-type secondary battery according to claim 4,
wherein the strip-shaped lead electrode sandwiched between the electrodes gradually increases in width outward from a stacked part.

6. The stacked-type secondary battery according to claim 1,
wherein the lead electrode has a resistivity equal to or lower than resistivities of the positive electrode and the negative electrode in contact therewith.

7. The stacked-type secondary battery according to claim 6,
wherein the lead electrode is in a shape extended from a taking-out part to the outside of the battery cell to an end portion inside the electrode to concentrate current from the cathode and anode in contact therewith on the lead electrode.

8. The stacked-type secondary battery according to claim 4,
wherein the strip-shaped lead electrode is integrally configured such that a plurality of lead electrodes are provided in a comb shape from a common electrode part.

9. The stacked-type secondary battery according to claim 8,
wherein each of the lead electrodes provided in the comb shape is sandwiched between two negative electrodes in contact with each other when the lead electrode is used as a taking-out electrode for anode, and is sandwiched between two positive electrodes in contact with each other when the lead electrode is used as a taking-out electrode for cathode, and the lead electrodes for cathode and for anode are arranged not to simultaneously overlap one another.

10. The stacked-type secondary battery according to claim 8,
wherein the number of the lead electrodes provided in the comb shape is larger than the number of spaces between the electrodes to be required, and a plurality of the lead electrodes are arranged between the same electrodes.

11. The stacked-type secondary battery according to claim 1,
wherein the lead electrode is provided with an insulating layer for preventing short circuit near an end portion of the battery cell.

12. The stacked-type secondary battery according to claim 1,
wherein the charge layer of the battery cell that is a unit to be stacked as the stacked-type secondary battery, a part of the electrode in contact with the lead electrode that is in contact with the lead electrode of another electrode, and a side surface part are covered by an insulating layer.

13. The stacked-type secondary battery according to claim 1,
wherein taking-out by the lead electrode is performed only for one of the cathode and the anode, and
wherein the other of the negative electrode and the positive electrode is extended from a charge layer region to overlap as the taking-out electrode.

14. The stacked-type secondary battery according to claim 1,
wherein the battery cell that is a unit to be stacked as the stacked-type secondary battery is formed such that a charge layer is formed in a region smaller than the positive electrode or the negative electrode on the positive electrode or the negative electrode, and a positive electrode or a negative electrode corresponding to the positive electrode or the negative electrode is formed in a region smaller than the charge layer,
wherein the battery cells are superposed one on the other such that the positive electrodes or the negative electrodes are in contact with each other, and
wherein the positive electrode or the negative electrode surrounded by the charge layer is taken out to the outside by the lead electrode.

15. The stacked-type secondary battery according to claim 13,
wherein the lead electrode is arranged to be taken out to the outside from the positive electrode or the negative electrode surrounded by the charge layer, and a portion in contact with the charge layer and one of the electrodes is coated with an insulating layer.

16. The stacked-type secondary battery according to claim 13, wherein the lead electrode is arranged to be taken out to the outside from the positive electrode or the negative electrode surrounded by the charge layer, and an insulating layer is provided at least in a region of the charge layer and the one of electrode parts in contact with the lead electrode.

17. The stacked-type secondary battery according to claim 1,
wherein the lead electrodes from electrode contact parts of a plurality of the stacked-type secondary batteries are made common thereto.

18. The stacked-type secondary battery according to claim 16,
wherein one of the positive electrode and the negative electrode is extended from the charge layer region to form a taking-out electrode, a lead electrode that electrically couples the plurality of stacked-type secondary batteries is arranged, and
wherein the lead electrodes from electrode contact parts of the plurality of stacked-type secondary batteries are made common as the other electrode.

19. The stacked-type secondary battery according to claim 17,
wherein the electrodes on both side surface of the stacked-type secondary battery are the same positive electrodes or the negative electrodes;
wherein one of the positive electrode and the negative electrode is extended from a charge layer region to form a taking-out electrode, and the electrode extended to form the taking-out electrode is not connected by the lead electrode between the plurality of stacked-type secondary batteries,
wherein the lead electrodes from the electrode contact parts of the plurality of stacked-type secondary batteries are made common as the other electrode, and
wherein after the plurality of stacked-type secondary batteries are assembled using the lead electrode in common, the plurality of stacked-type secondary batteries are superposed one on the other by folding the stacked-type secondary batteries like an accordion with the common lead electrode located outside the stacked-type secondary batteries as a fold.

* * * * *